United States Patent [19]

Guilfoyle et al.

[11] Patent Number: 4,864,524
[45] Date of Patent: Sep. 5, 1989

[54] COMBINATORIAL LOGIC-BASED OPTICAL COMPUTING METHOD AND APPARATUS

[75] Inventors: Peter S. Guilfoyle, Zephyr Cove, Nev.; W. Jackson Wiley, San Jose, Calif.

[73] Assignee: Opticomp Corporation, Zephyr Cove, Nev.

[21] Appl. No.: 31,431

[22] Filed: Mar. 27, 1987

[51] Int. Cl.$^4$ .......................... G06F 7/56; G06F 7/04
[52] U.S. Cl. .................................. 364/713; 340/146.2
[58] Field of Search ....................... 364/713; 340/146.2

[56] References Cited

U.S. PATENT DOCUMENTS

| | | | |
|---|---|---|---|
| 3,466,433 | 9/1969 | Duda et al. | 364/713 |
| 3,680,080 | 7/1972 | Maure | 364/713 |
| 4,354,247 | 10/1982 | Yao | 364/713 |
| 4,418,394 | 11/1983 | Tai | 364/713 |
| 4,667,300 | 5/1987 | Guilfoyle | 364/713 |

Primary Examiner—David H. Malzahn
Attorney, Agent, or Firm—Limbach, Limbach & Sutton

[57] ABSTRACT

An optical computer apparatus and method in which binary operations are implemented by utilizing optical elements to perform AND-OR-INVERT operations of the binary operation and combinatorial logic elements perform the remaining operations. Preferably, a pair of acousto-optic cells are energized by binary data, which data are supplied by combinatorial logic, and which cells modulate light rays that are focused on detectors which determine the presence or absence of light. The particular combination of data supplied by the combinatorial logic is a function of the operations remaining in the desired binary operation once any AND-OR-INVERT functions have been implemented by way of optical structures. Further, the propagational time through the acousto-optic cells is utilized to implement systolic type implementations of binary functions.

20 Claims, 23 Drawing Sheets $E = \overline{A_1 B_1 + A_1 B_1 + \overline{A_2} B_2 + A_2 B_2 + \cdots + \overline{A_n} B_n + A_n B_n}$

TABLE 1

$O_1 = A_0 B_0$ $O_2 = A_0 \overline{B_0} B_1 + \overline{A_0} A_1 B_0 + A_1 \overline{B_0} \overline{B_1} + A_0 \overline{A_1} B_1$ $O_3 = \overline{A_0} \overline{A_1} A_2 B_0 + A_0 \overline{B_0} \overline{B_1} B_2 + A_0 \overline{A_2} B_0 B_2 + A_1 \overline{B_0} B_1 \overline{B_2}$
$\quad + \overline{A_0} A_1 \overline{A_2} B_1 + \overline{A_0} A_1 A_2 \overline{B_0} B_1 + \overline{A_0} A_1 A_2 B_0 \overline{B_1} \overline{B_2} + A_0 A_1 \overline{B_0} B_1 B_2$ $O_4 = A_1 \overline{B_0} \overline{B_1} B_2 + \overline{A_0} \overline{A_1} A_2 \overline{B_1} + A_0 A_2 \overline{B_0} B_1 + \overline{A_0} A_1 B_0 B_2 + \overline{A_1} A_2 B_1 \overline{B_2}$
$\quad + A_1 \overline{A_2} B_1 \overline{B_2} + A_2 \overline{B_0} B_1 \overline{B_2} + \overline{A_0} \overline{A_1} A_2 B_0 \overline{B_1} B_2 + A_0 A_1 \overline{A_2} B_0 B_1 \overline{B_2}$ $O_5 = A_2 \overline{B_0} \overline{B_1} B_2 + \overline{A_0} \overline{A_1} A_2 B_2 + A_0 A_2 \overline{B_1} B_2 + \overline{A_1} A_2 \overline{B_1} B_2$
$\quad + A_1 A_2 \overline{B_0} B_1 B_2 + A_0 A_1 A_2 B_0 B_1 B_2$ $O_6 = A_1 A_2 B_1 B_2 + A_0 A_1 A_2 B_0 B_2 + A_0 A_2 B_0 B_1 B_2$

FIG. 19

TABLE 2

| $C_n$ | | $a_n$ | CH | CH | $b_n$ | CH | CH |
|---|---|---|---|---|---|---|---|
| $C_1$ | = | $A_0$ | 1 | 2 | $B_0$ | 1 | 3 |
| $C_2$ | = | $A_1$ | 4 | 10 | $B_1$ | 5 | 11 |
| $C_3$ | = | $A_2$ | 8 | 15 | $B_2$ | 9 | 16 |
| $C_4$ | = | $A_2 A_0$ | 21 | 25 | $B_2 B_0$ | 22 | 26 |
| $C_5$ | = | $A_2 A_1$ | 17 | 35 | $B_2 B_1$ | 18 | 34 |
| $C_6$ | = | $\overline{A}_1 A_0$ | 30 | 33 | $B_2 \overline{B}_1$ | 31 | 33 |
| $C_7$ | = | $\overline{A}_2 A_0$ | 5 | 14 | $\overline{B}_1 B_0$ | 4 | 13 |
| $C_8$ | = | $A_1 \overline{A}_0$ | | 9 | $B_1 \overline{B}_0$ | | 8 |
| $C_9$ | = | $A_2 \overline{A}_0$ | 12 | 18 | $B_2 \overline{B}_0$ | 12 | 17 |
| $C_{10}$ | = | $\overline{A}_2 A_1$ | 13 | 27 | $\overline{B}_2 B_1$ | 14 | 28 |
| $C_{11}$ | = | $A_2 \overline{A}_1$ | 3 | 20 | $B_2 \overline{B}_1$ | | 19 |
| $C_{12}$ | = | $A_2 A_1 A_0$ | 28 | 29 | $B_2 B_1 B_0$ | 20 | 29 |
| $C_{13}$ | = | $A_2 \overline{A}_1 A_0$ | 32 | 34 | $B_2 \overline{B}_1 B_0$ | | 35 |
| $C_{14}$ | = | $A_2 A_1 \overline{A}_0$ | 19 | 23 | $B_2 B_1 \overline{B}_0$ | | 23 |
| $C_{15}$ | = | $\overline{A}_2 A_1 A_0$ | | 31 | $\overline{B}_2 B_1 B_0$ | 2 | 30 |
| $C_{16}$ | = | $A_2 \overline{A}_1 \overline{A}_0$ | 6 | 26 | $B_2 \overline{B}_1 \overline{B}_0$ | 7 | 25 |
| | | $\overline{A}_2 A_1 \overline{A}_0$ | 11 | 22 | $\overline{B}_2 B_1 \overline{B}_0$ | | 21 |
| | | $\overline{A}_2 \overline{A}_1 A_0$ | 16 | 24 | $\overline{B}_2 \overline{B}_1 B_0$ | | 10 |

FIG. 20

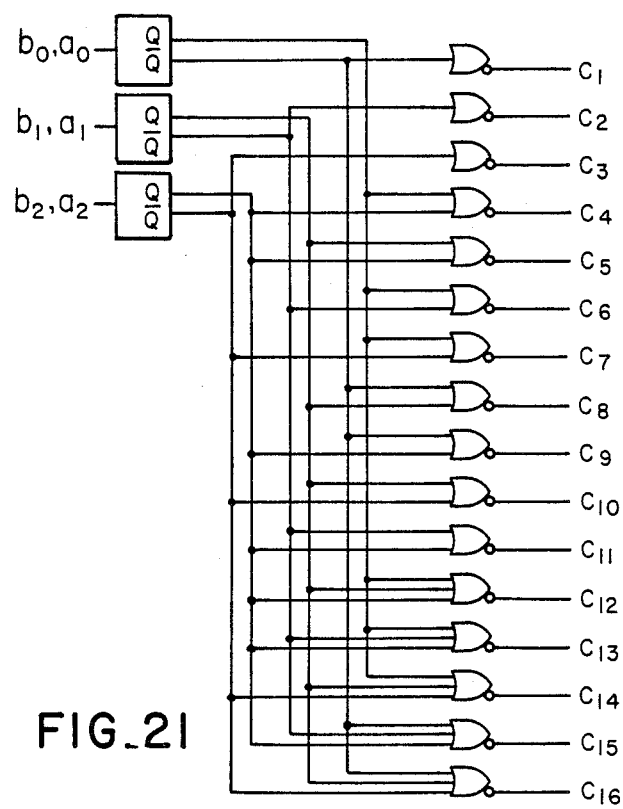
FIG_21

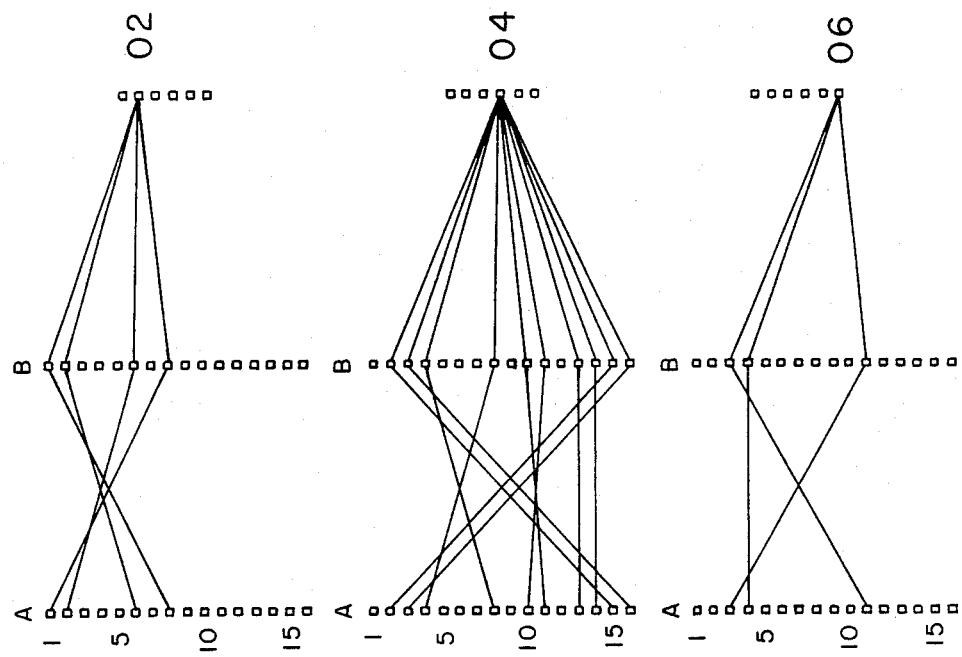
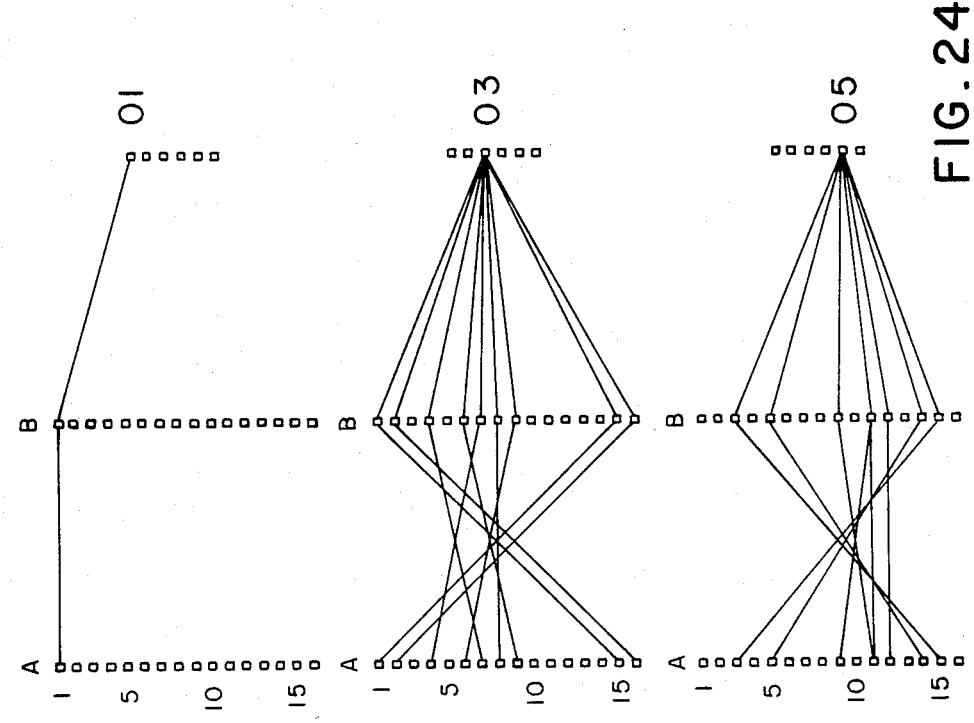
FIG. 24

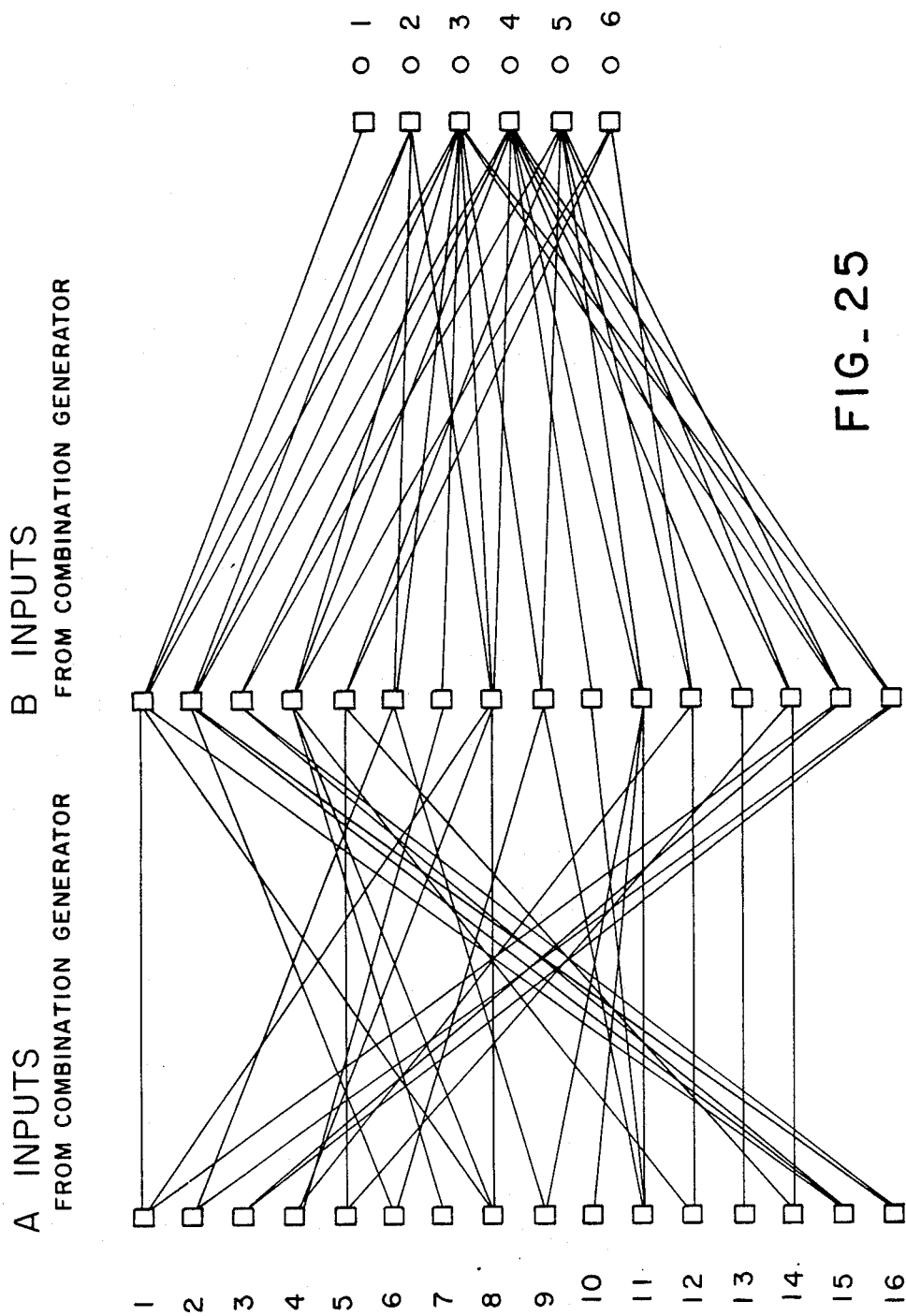

COMBINATORIAL LOGIC-BASED OPTICAL COMPUTING METHOD AND APPARATUS

DESCRIPTION

1. Technical Field

The present invention is directed generally to binary computing operations, and more particularly to a method and apparatus for binary computing which employs a optically implemented Boolean AND-OR element as a building block for implementing more complex binary computing operations.

2. Background Art

Most of the sophisticated compute-intensive problem solving processors in the present state of the art, rely on a common set of algorithms found in numerical matrix algebra. Whitehouse and Spieser "Aspects of Signal Processing," Part 2, pp. 669–702, Proc. NATO Advanced Study Institute, 1976. Typically, all of these problems are broken up into a set of linear equations where it is the processor's task to solve this set. See Spieser and Whitehouse, "Review of Signal Processing With Systolic Arrays", Proc. SPIE 431,2, 1983. Algorithmic solutions range from the extensive use of the Fast Fourier Transform to the robust Singular Value Decomposition method. Kailaith, "Signal Processing in the VLSI Era," *VLSI and Modern Signal Processing*, Kung et al., Editors, Chap. 1, 1985. Over the past several years considerable research has been focused on the use of systolic arrays, which, when configured correctly, will process these algorithms at extremely high speeds and with great algorithmic efficiency. Kung, "Why Systolic Arrays?" IEEE COMPUTER, 15(1):37–46, 1982. Gentleman and Kung, "Matrix Triangularization by Systolic Arrays," Proc. SPIE Symp., Vol 298, August 1981.

To obtain these high speeds, systolic hardware development has progressed primarily in two areas: (1) semiconductor VLSI arrays utilizing two dimensional planar semiconductor technology and (2) acousto-optic analog and digital arrays utilizing three dimensional optical interconnect technology. Delwide, et al., "Parallel and Pipelined VLSI Implementation of Signal Processing Algorithms," *VLSI and Modern Signal Processing*, Kung et al., Editors, Chap. 15, 1985. McAulay, "Optical Crossbar Interconnected Digital Signal Processor With Basic Algorithms," OPTICAL ENGINEERING, Vol. 25, No. 1, pp. 82–90, Jan. 1986. Rhodes, et al., "Acousto-Optic Algebraic Processing Architectures," PROCEEDINGS OF THE IEEE, special issue on Optical Computing, July, 1984. Guilfoyle, "Systolic Acousto-Optic Binary Convolver," OPTICAL ENGINEERING, Vol. 23, No. 1, pp. 20–25, Jan./Feb. 1984. Drake, et al., "Photonic Computing Using the Modified Signed-Digit Number Representation," OPTICAL ENGINEERING, Vol. 23, 44, Jan. 1986. Gaylord, et al., "Optical Digital Truth Table Look-up Processing," OPTICAL ENGINEERING, Vol. 24, No. 1, pg. 48, 1985.

With the gate densities of silicon chips used in VLSI approaching several hundred thousand per chip, it would appear that optical computing engines need an equivalent if not far greater gate density (per dollar), to be competitive. FIG. 1 depicts a parallel interconnected optical system of gates. To achieve gate densities on the order of 1 million this system needs to have input spatial light modulators capable of $1000 \times 1000$ pixel address. Today's modulators are typically capable of $256 \times 256$ or 65536 pixel address although future devices may have higher performance. Clearly, using a digital optical system in this configuration does not have significant gate density. Unless the system is clocked at Ghz rates (achievable, although difficult to interface), the engine's competitiveness to VLSI is marginal at best.

Optical systems however, are not limited to "nearest neighbor" or parallel interconnect configurations. As shown in FIG. 2, it is possible to have each pixel in input plane 1 address every pixel in input plane 2. With appropriate optics it is also conceivable that each gate product can be relayed to any point in the output plane where each product may stand alone or be combined with any or all of the other products, etc. Considering only the global interconnect capability, the maximum interconnect density would increase from $256^2$ to $256^4$—4,296,967,296 or the equivalent of approximately 4 to 8 thousand VLSI chips at the same clock speed. If an interconnect scheme could be found which only utilizes 10 to 20 percent of the total interconnect capability, then clearly orders of magnitude improvement in density may be realized in the immediate future. As spatial light modulating devices improve, this lead can only increase. The key, however, is to determine optimal interconnect architecture.

While there is much promise of high speed bit manipulation through the use of optical systems, the use of an optical system does not necessarily lead to efficient or easily implemented bit manipulation. If computing is defined as an operation resulting in "gain," wherein a multiplicity of inputs results in a reduced number of outputs, there are many "non-computers." Many examples of such "non-computers" can be found—the outer-product processor, $2n$ inputs and $n^2$ outputs.

Previous optical multiply schemes were centered about the DMAC (Digital Multiplication by analog convolution) algorithm. These schemes relied upon threshold detecting many analog levels, a task which can be quite difficult. Previous addition schemes were performed in analog or not at all optically.

SUMMARY OF THE INVENTION

These and other problems and disadvantages of prior computing schemes are overcome by the present invention of a method and apparatus operable on a first set and a second set of binary data for performing a binary operation upon the binary data comprising optical means for performing Boolean AND-OR operations upon binary information supplied to it; and combinatorial logic means responsive to the binary data for conditioning the binary data and applying the conditioned binary data to the optical means as the binary information to be operated upon thereby, wherein said combinatorial logic means provides different combinations of the binary data and complements thereof to the optical means as a function of the binary function being implemented.

The optical means can comprise light source means for providing a beam of light which propagates along an optical path; first acousto-optic cell means responsive to the first set of binary data and positioned in the optical path for propagating optical representations of the first set of binary data transversely to the optical path which modulate the light propagating therethrough; second acousto-optic cell means responsive to the second set of binary data and positioned in the optical path for propagating optical representations of the second set of binary data transversely to the optical path, wherein the second acousto-optic cell means is positioned relative to the first acousto-optic cell means so that modulated light from the first acousto-optic cell means is modulated by the representations of the second set of binary data propagating through the second acousto-optic cell means; detector means positioned in the optical path to receive light which has been modulated by the first and second acousto-optic cell means for determining the presence or absence of light at predetermined points in a plane transverse to the optical path; and lens means positioned in the optical path for focusing portions of the light which have been modulated by the first and second acousto-optic cell means onto selected ones of the predetermined points of the detector means, wherein the portions of the light which are so focused are selected according to the binary operation being performed by the apparatus upon the binary data.

In one embodiment of the present invention, light propagates in parallel rays along the optical path. In another embodiment, light is broadcast between the first and second acousto-optic cell means. This broadcasting is discussed in both the context of global broadcast in two dimensions and full global broadcast in three dimensions.

It is therefore an object of the present invention to provide a combinatorial logic based optical computing method and apparatus.

It is another object of the present invention to provide a method and apparatus for binary computation which employs an optical structure which implements a Boolean AND-OR function as a building block, and which employs combinatorial logic to provide combinations of the bits of the binary words being operated on to the optical structure.

It is a further object of the present invention to provide a combinatorial logic based optical computing method and apparatus which employs a detector that operates as an OR gate, and not a summing or threshold device.

It is still another object of the present invention to provide a combinatorial logic based optical computing method and apparatus in which the three dimensional global interconnect capability of optics is exploited.

It is a still further object of the present invention to provide a combinatorial logic based optical computing method and apparatus which has computing "gain."

It is a still further object of the present invention to provide a combinatorial logic based optical computing method and apparatus which can be configurable as a systolic array.

These and other objectives, features, and advantages will be more readily understood upon consideration of the following detailed description of certain preferred embodiments of the present invention and the accompanying drawings.

BRIEF DESCRIPTION OF THE DRAWINGS

FIG. 19 is a table of boolean equations for a $3\times3$ multiplication which has been reduced to 35 terms.

FIG. 20 is a table of the combinatorial assignment for a full parallel optical imaging system in accordance with the present invention.

FIG. 21 is a simplified schematic of a combinatorial logic combination generator for $3\times3$ multiplication.

FIG. 24 illustrates a global interconnect scheme for each output bit of the $3\times3$ bit multiply in accordance with the present invention.

FIG. 25 is a composite superposition of each output bit global interconnect for a $3\times3$ bit multiply PLA.

DETAILED DESCRIPTION OF THE PREFERRED EMBODIMENT

The present invention implements a number of design approaches and employs several discoveries concerning the structure of binary processing operations and optical processing architectures. These design approaches and discoveries are expressed, in part, below:

1. Utilize the three dimensional global interconnect capability of optics.
2. Use a detector as an "OR" gate not threshold or summing device.
3. Insert both the bit and its complement when required.
4. Split problems between the combinatorial logic conditioner and optical processor for maximum effectiveness.
5. Limit circuit designs to combinations of "AND-OR-INVERT" configurations (most circuits may be modified this way).
6. Systolically interconnect PLAs (programmable logic arrays).
7. Make sure the computation cell is designed to have gain.
8. Use Acousto-optic cells as an automatic synchronous clock and bi-directional shift register sequencer.
9. Use computer generated holograms or lens configurations to broadcast light.
10. Use each pixel under each electrode several times as a multiple "AND" gate.
11. Try to use feedback whenever possible.
12. Try to balance the use of "ORs" with globally interconnected "ANDs."

These concepts will be better understood upon consideration of the following examples:

TEXT SEARCHER OPTICAL COMPUTER

Figure 2:
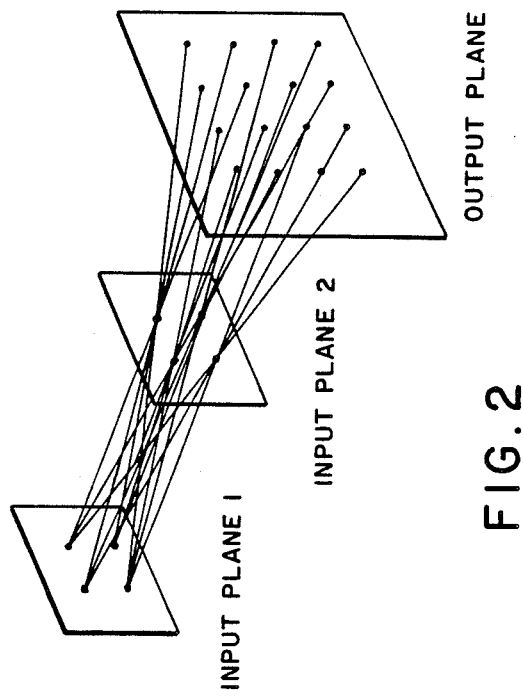
FIG. 2 is an illustration of globally interconnected optical gates in a typical optical system.
Figure 1:
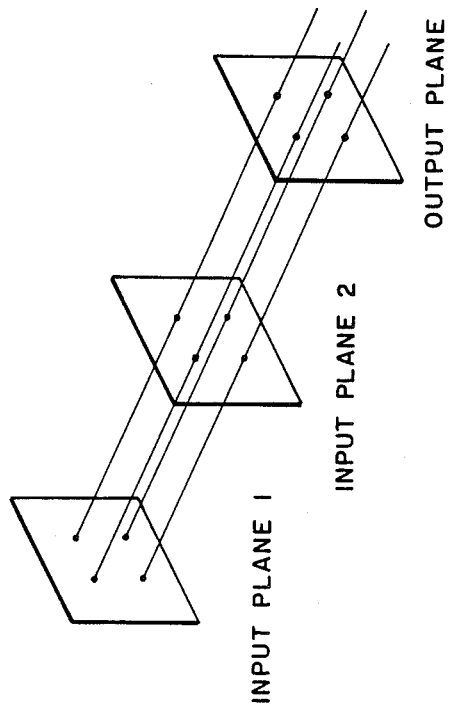
FIG. 1 is an illustration of parallel interconnected optical gates in a typical optical system.
Figure 3:
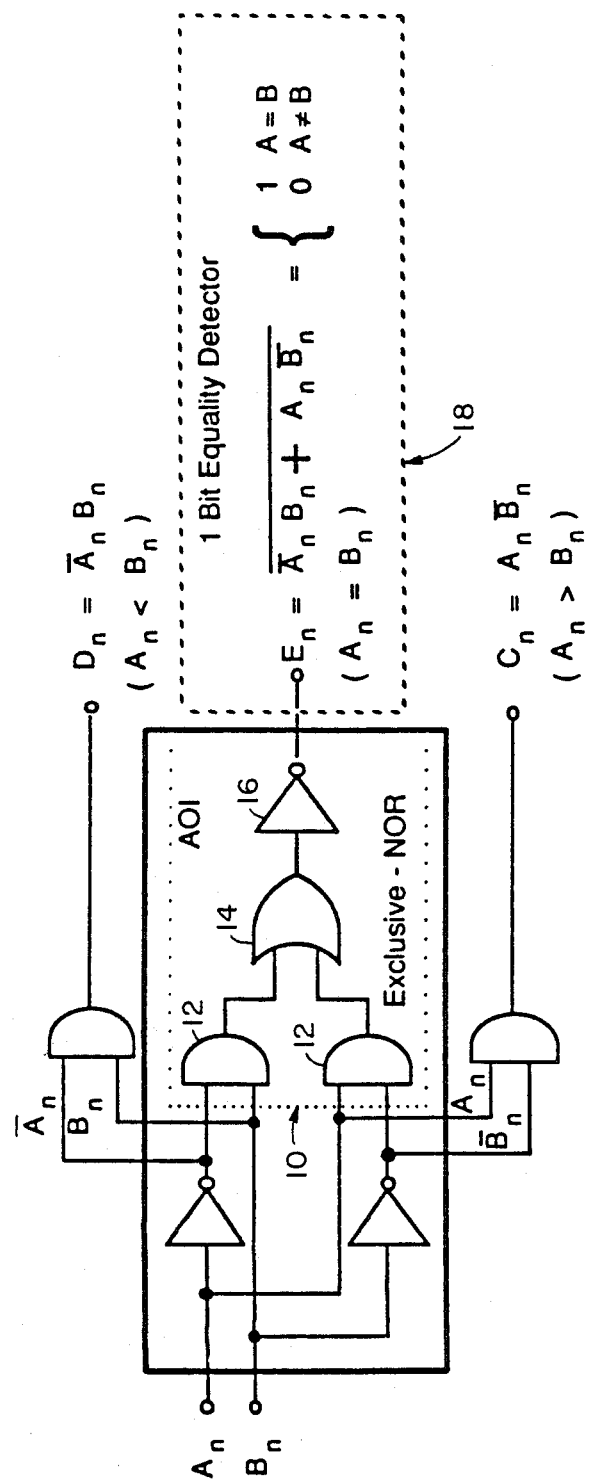
FIG. 3 is an illustration of a one bit equality detection circuit expressed in electronic digital hardware symbology.

Consider the one bit (or single bit) equality detection circuit shown in FIG. 3. The fundamental building block of this circuit is the "exclusive nor" circuit 10 shown in the dotted box. This circuit comprises two "AND" gates 12, one "OR" gate 14 and an inverter gate 16. Examination of most digital integrated circuits reveals that much, if not all, circuitry is comprised of combinations of this AND-OR building block. Given two input bits $A_n$ and $B_n$, as shown in the figure, the output of the equality detector, block 18, is 1 if $A_n = B_n$. The Boolean equation shown in block 18 illustrates this relationship.

Figure 4:
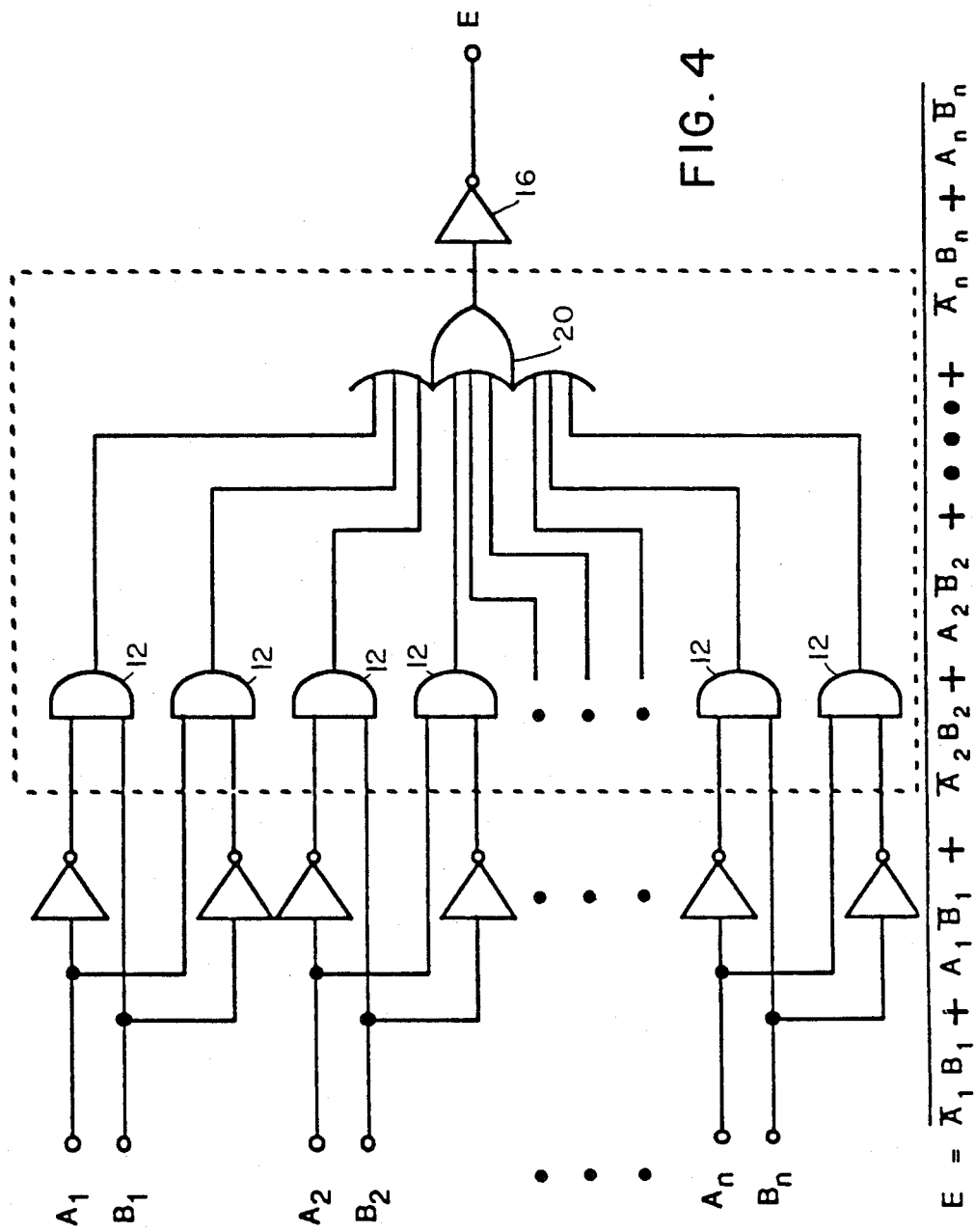
FIG. 4 is an illustration of a word equality detection circuit.

To enable the comparison of two digital words a circuit as shown in FIG. 4 can be used. The output of the circuit is one if both input words are equal, i.e., $A(1,2 \ldots n) = B(1,2 \ldots n)$. This is a very useful function in pattern, text and symbolic recognition. In the word equality detection circuit of FIG. 4 notice that 2n "AND" gates 12 are used and one massive-2n-input "OR" gate 20 is used.

Figure 5:
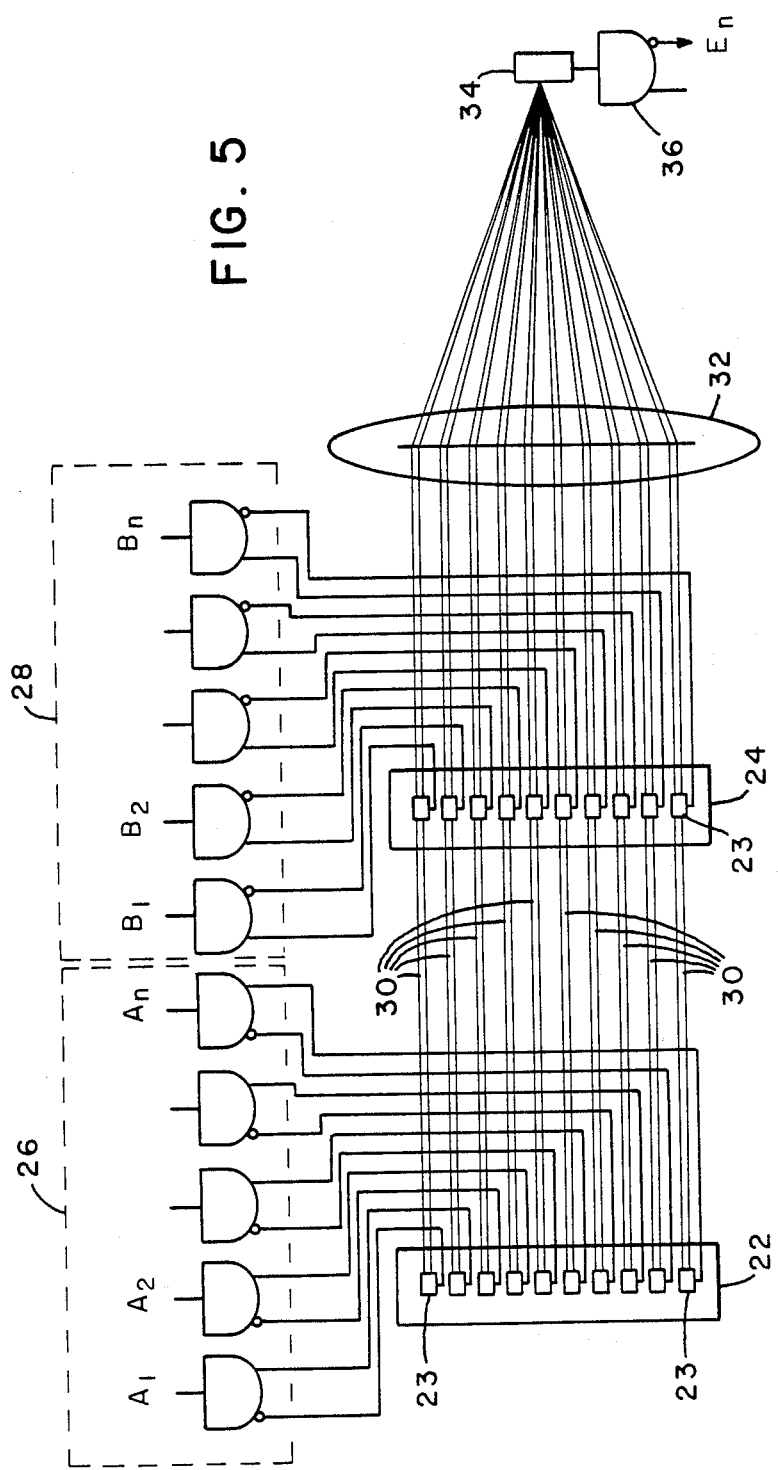
FIG. 5 is a simplified block diagram of an optical word comparator circuit in accordance with the present invention.

Several key concepts are demonstrated in FIG. 5 which illustrates an optical implementation of FIG. 4 in accordance with the present invention. First and second acousto-optic cells 22 and 24, respectively, receive binary bits from conditioning circuits 26, for word A, and from conditioning circuits 28, for word B. Light propagates along parallel optical paths 30 and is modulated by the bits propagating through the first and second acousto-optic cells 22 and 24. Lens 32 focuses the modulated light onto detector 34 and inverter 36 inverts the output state of detector 43.

In the embodiment shown in FIG. 5, the acousto-optic cells 22 and 24 each have a plurality of electrodes 23. Each electrode 23 receives a bit of data which modulates the transmissiveness of the portion of the acousto-optic cell beneath the electrode as a function of the logic state of the bit. The acousto-optic cells 22 and 24 are positioned with respect to one another so that each electrode 23 in cell 22 controls a portion of the cell which modulates light propagating along an optical path that passes through the portion of acousto-optic cell 24 that is controlled by a counterpart electrode 23.

When the acousto-optic cell has a depth dimension, into the page, the transmissiveness modulation due to the bit of data can be said to propagate through the cell, along the depth dimension. The propagation of these optical representations of the bits of data can be controlled in time so that the optical representation of a data bit from an electrode 23 of acousto-optic cell 22 modulates the beam of light propagating along the same optical path that is being modulated by a corresponding optical representation of a data bit from an electrode 23 of a acousto-optic cell 24. Reference is made to U.S. patent application Ser. No. 517,771, filed July 27, 1983, now U.S. Pat. No. 4,667,300, issued May 19, 1987, incorporated herein by reference, and assigned to the assignee of the present application, where a more detailed description of such propagation is described.

The first and most important concept is that the machine is designed with the intention of using the detector 34 as an OR gate. Unlike most optical computers where the detector either sums many rays, time integrates (again summing), or sees a threshold level such as in the many threshold logic proposals, the detector 34 employed in the present invention merely wants to know if there is light or no light. The only instance where the output is high is if there is no light. It is not acting as a threshold device but merely as a detector.

Figure 8A:
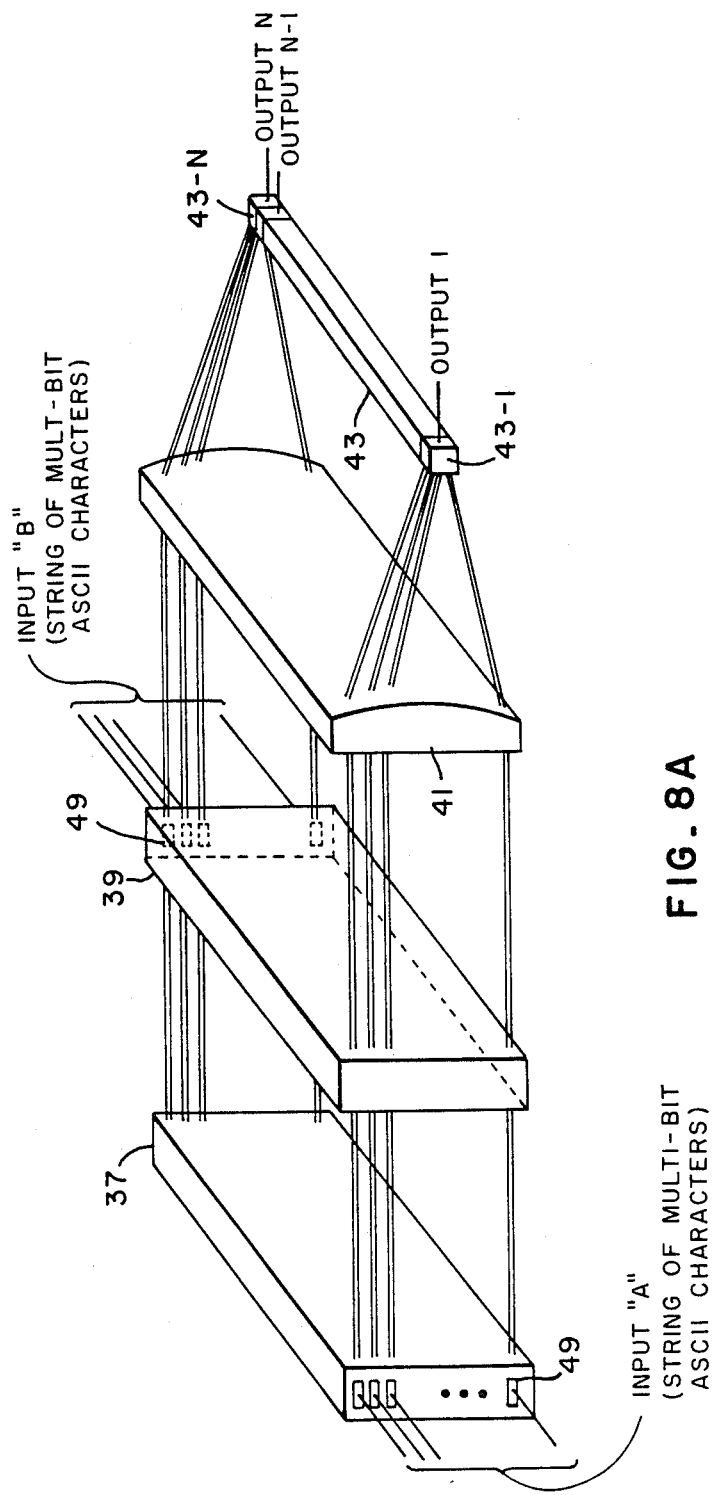
FIG. 8A is a block diagram of an optical implementation of a systolically interconnected, three dimensional word string text searcher in accordance with the present invention.

The second important observation about this circuit is the input of both a bit and its complement for each bit of each word. In most cases, having the complement bit in the optical system enables a most general implementation of various circuits. The complement inputs are generated in a preprocessing combinatorial logic conditioner (described later in connection with in FIG. 8).

Recognition that any optical system is a natural "and-or-invert" circuit, is another key concept which can be exploited in an optical implementation of the binary circuits such as that of FIG. 4. With the "AND-OR-INVERT" building block most any circuit combination can be designed.

Figure 6:
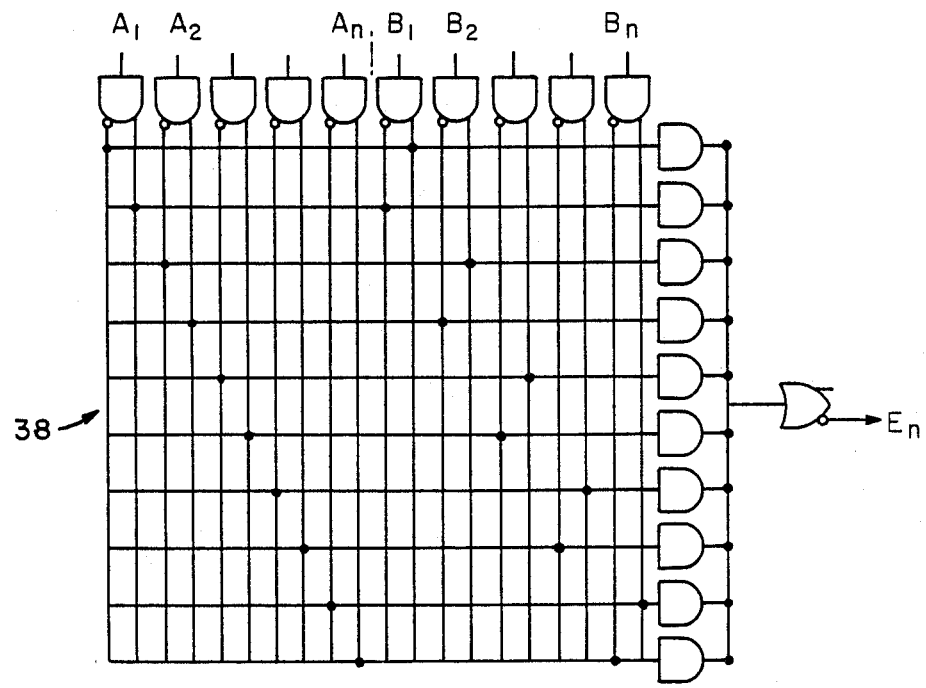
FIG. 6 is a programmable logic array representation of the optical word comparator circuit of FIG. 5.
Figure 7:
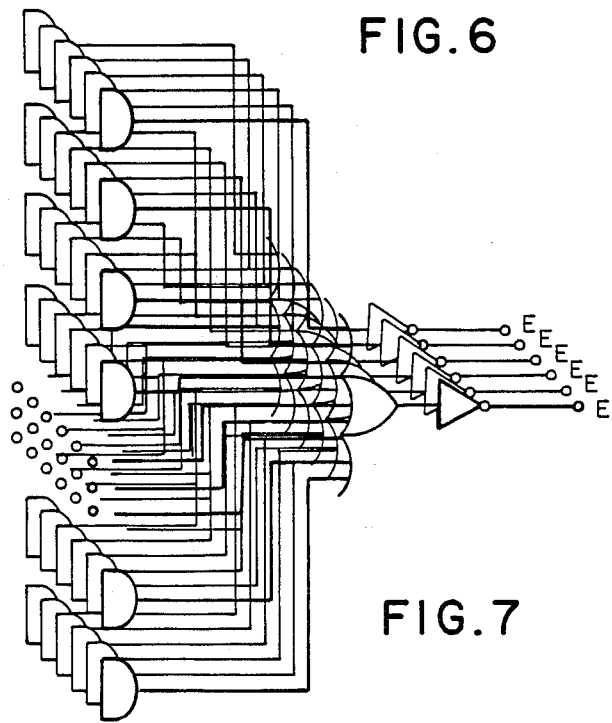
FIG. 7 is a logical symbol model of a three dimensional word string text searcher optical computer in accordance with the present invention.

To further aid in the understanding of the potential of these concepts, the system can be modeled as a programmable logic array 38 as shown in FIG. 6. Any combination of dots (interconnects) may be placed on the PLA diagram to enable the desired function, in this case word comparison. The circuit in FIG. 5 is representative of a planar technology where the depth dimension of the acousto-optic cells is small, i.e., it does not exploit the three dimensionality of optics. In accordance with the present invention, instead of having two multichannel electrodes, as shown in FIG. 5 and modeled in FIG. 6, merely modulating one spot of light, two multichannel acousto-optic cells 37 and 39 are utilized, counter propagating and telecentrically imaged, as if the system represented a multichannel convolver where across all convolution regions, a cylindrical lens 41 focuses all rays onto a linear detector array 43. The resultant structure is illustrated by way of a three dimensional or multiplanar logic array, shown in FIG. 7.

Figure 8B:
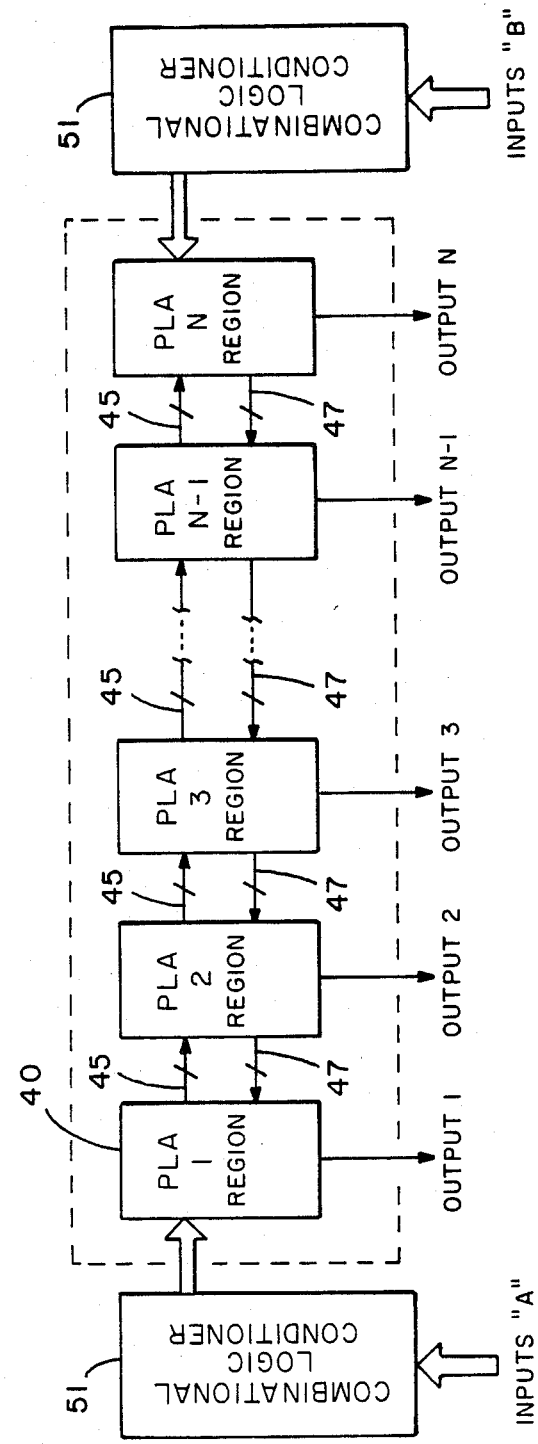
FIG. 8B is a block diagram model of a systolically interconnected programmable logic structure.

If each acousto-optic cell 37 and 39 has a rather modest time bandwidth product of 256 this system could be modeled as 256 systolically interconnected PLAs as depicted in FIG. 8B. The user can input two strings of text, 256 ASCII characters long, at inputs "A" and inputs "B". Two 16-channel acousto-optic cells 37 and 39 are employed along with one 256 element detector 41 array, where each detector, e.g. 41-1, only detected the presence of light or no light (see FIG. 8A). With respect to the model of FIG. 8B, the data path 45, shown traversing from left to right, represents the propagational paths of the optical representations of the bits of data applied to the electrodes 49 of acousto-optic cell 37. The data path 47, shown traversing from right to left, represents the propagational paths of the optical representations of the bits of data applied to the electrodes 49 of acousto-optic cell 39.

Combinatorial logic conditioners can be digital logic circuits similar to blocks 26 and 28 of FIG. 5 which supply complemented and uncomplemented logic states of the bits of the multi bit ASCII characters. Logic systems that utilize complemented and uncomplemented logic states are commonly referred to as dual rail logic systems.

A most important feature illustrated in the model in FIG. 8B is that the system has gain. Notice that in each PLA region 40 the product of 16 "AND" gates is being compressed to one output, therefore the gain in the system per PLA is 16:1. The total system gain for the 16×16 channel system, with a time bandwidth product of 256, is therefore 256×16 or 4096:1. In accordance with the present invention, without gain, a computer is not computing. Examples of many "non-computers" can be found—the outerproduct processor, 2n inputs and $n^2$ outputs.

Figure 9:
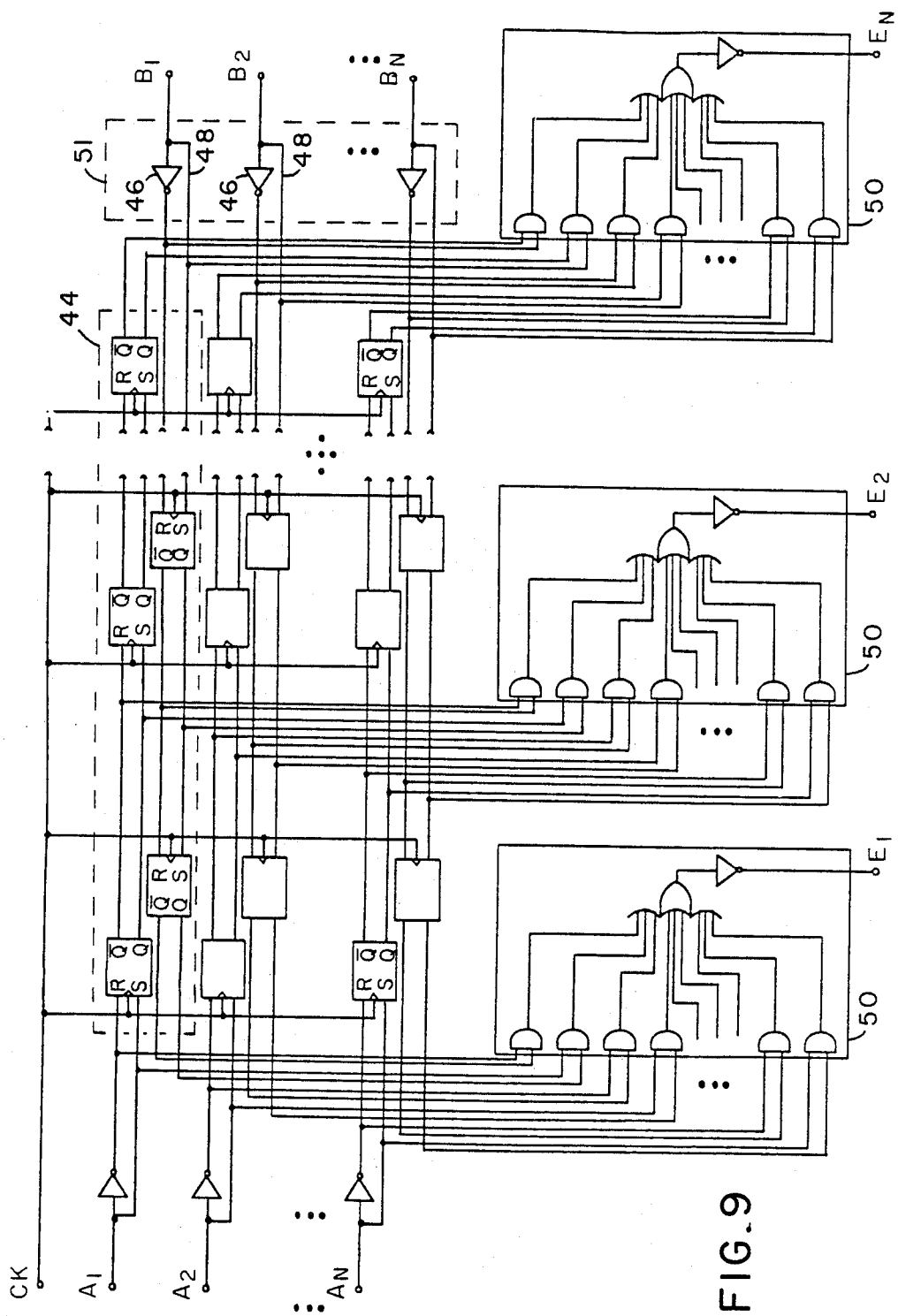
FIG. 9 is an equivalent schematic for an optical systolic equality detector in accordance with the present invention.

To physically model the system in terms of digital circuits, FIG. 9 depicts a schematic representation. Notice that between each word comparison stage the acousto-optic ("A-O") cells can be modeled as a bidirectional shift register 44. Since this is in effect "built in" to the optical systems this effect is used in the present invention as often as possible. This permits several systolic configurations and in effect provides an extremely stable synchronous clock. Combinatorial logic conditioner 51 is modeled as an array of inverters 46 and straight-through line connections 48. The collective operation of acousto-optic cells 37 and 39, cylindrical lens 41, and detector array 43, is modeled as N AND-OR-INVERT blocks 50.

OPTICAL FULL ADDER USING GLOBAL BROADCAST

Figure 11:
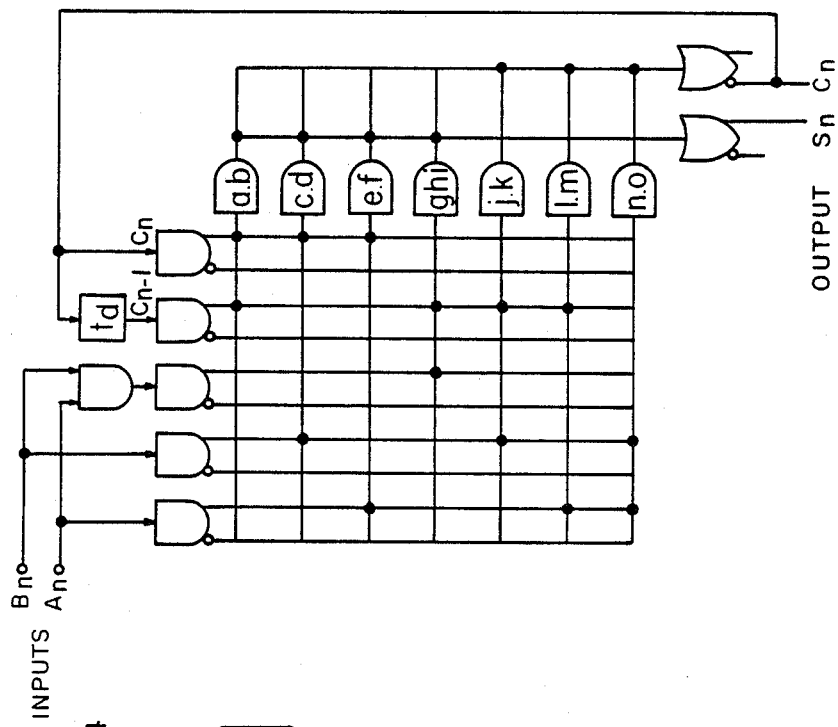
FIG. 11 is a block diagram representation of an programmable logic array implementation of a serial full adder.
Figure 10:
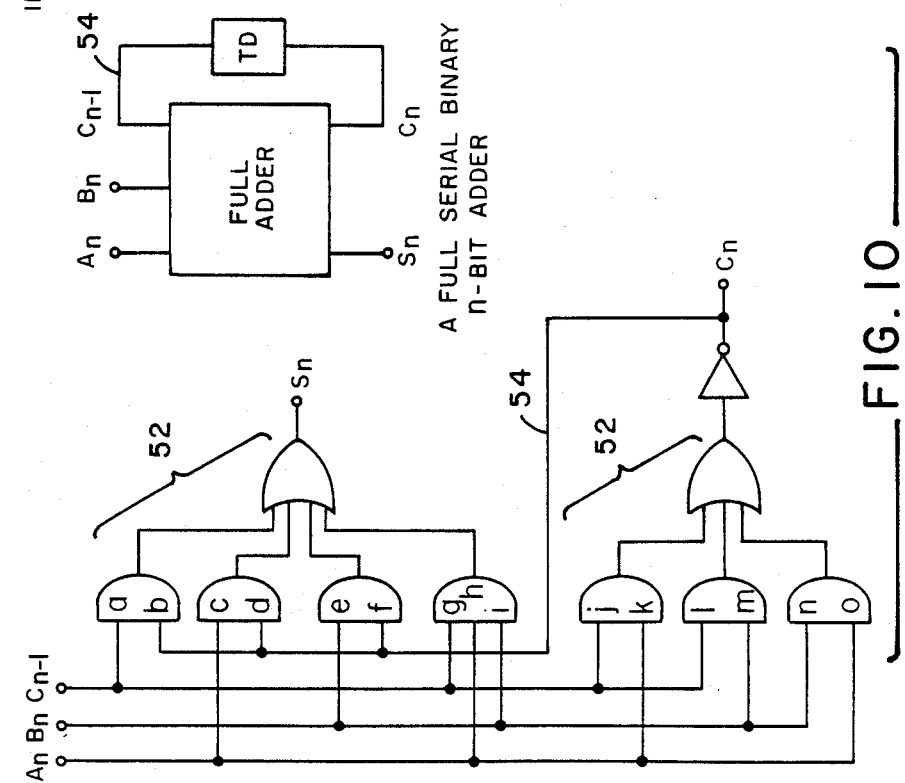
FIG. 10 is a schematic representation of a sequential digital full adder.

Consider the sequential full adder circuit of FIG. 10. Notice that it is comprised of two basic building blocks: (1) the "AND-OR-INVERT" circuit 52 and (2) feedback paths 54. This circuit can thus be readily implemented in optics, as optics naturally simulates the "AND" then "OR" function. In addition, this circuit can be mapped easily onto the PLA format as shown in FIG. 11. Notice also that this circuit does not require the input of any complementary bits. The only small problem in the mapping might be the g,h,i, gate, as it has three inputs. This can be implemented either optically as three sequential electrodes, or broken up into two-input "and" gates, as shown.

Figure 12:
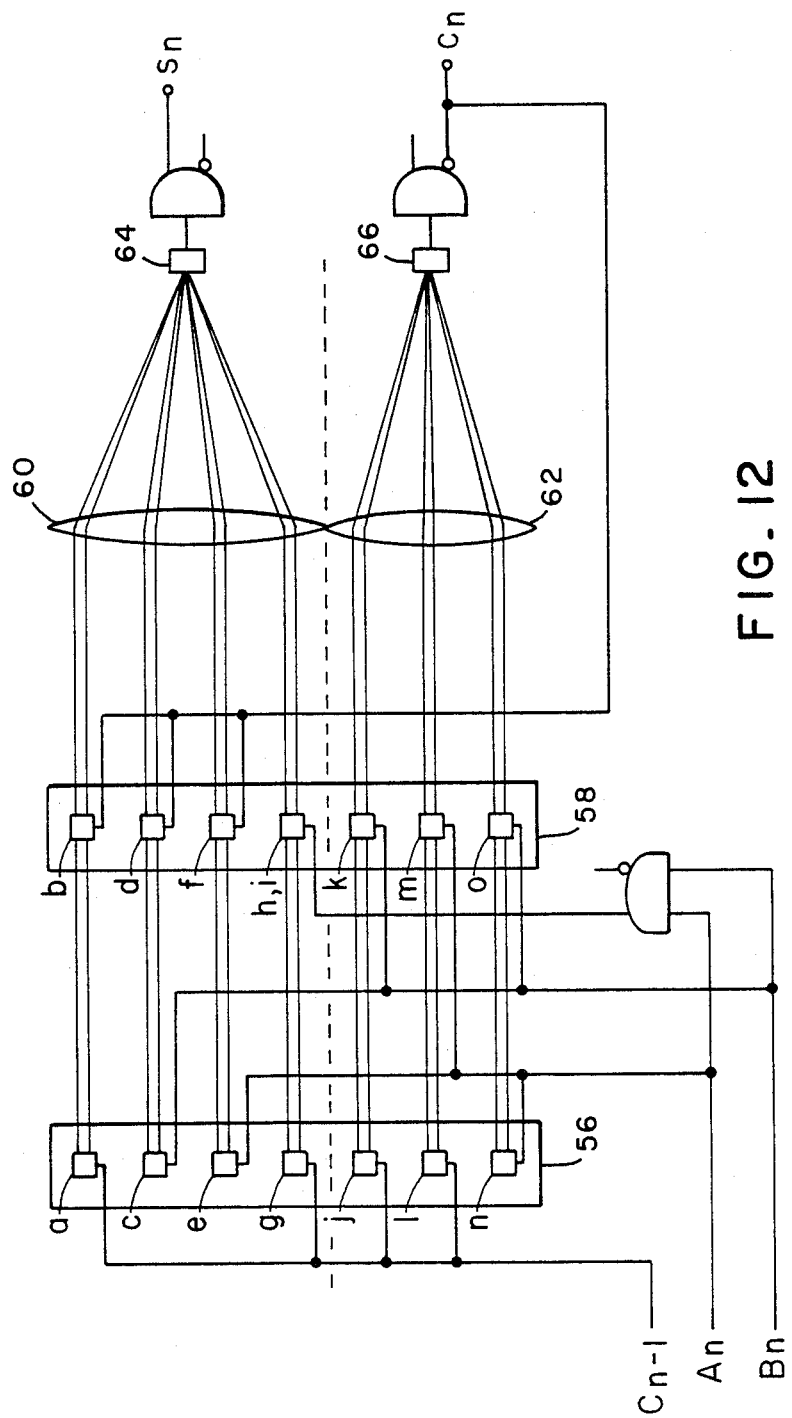
FIG. 12 is a block diagram of an optical full adder, non-broadcast, full parallel, in accordance with the present invention.

FIG. 12 shows the parallel mapping of the full adder onto an optical system. This "first cut" mapping employs acousto-optic cells 56 and 58, lens 60 and 62, and shows full reverse broadcasting onto the two detectors 64 and 66 which are again working as "or" gates (as opposed to summing or thresholding). The circuit can be said to have gain as there exist only three inputs and two outputs. Also notice that the complexity of the optical system is on the order of 14 (for the 14 gates). The parallel system is not the preferred embodiment of the present invention, however, as the there exist several areas of redundancy. Notice the carry bit from the previous iteration $C_{n-1}$, is broadcast to electrodes a,g,j, & l.

Figure 13:
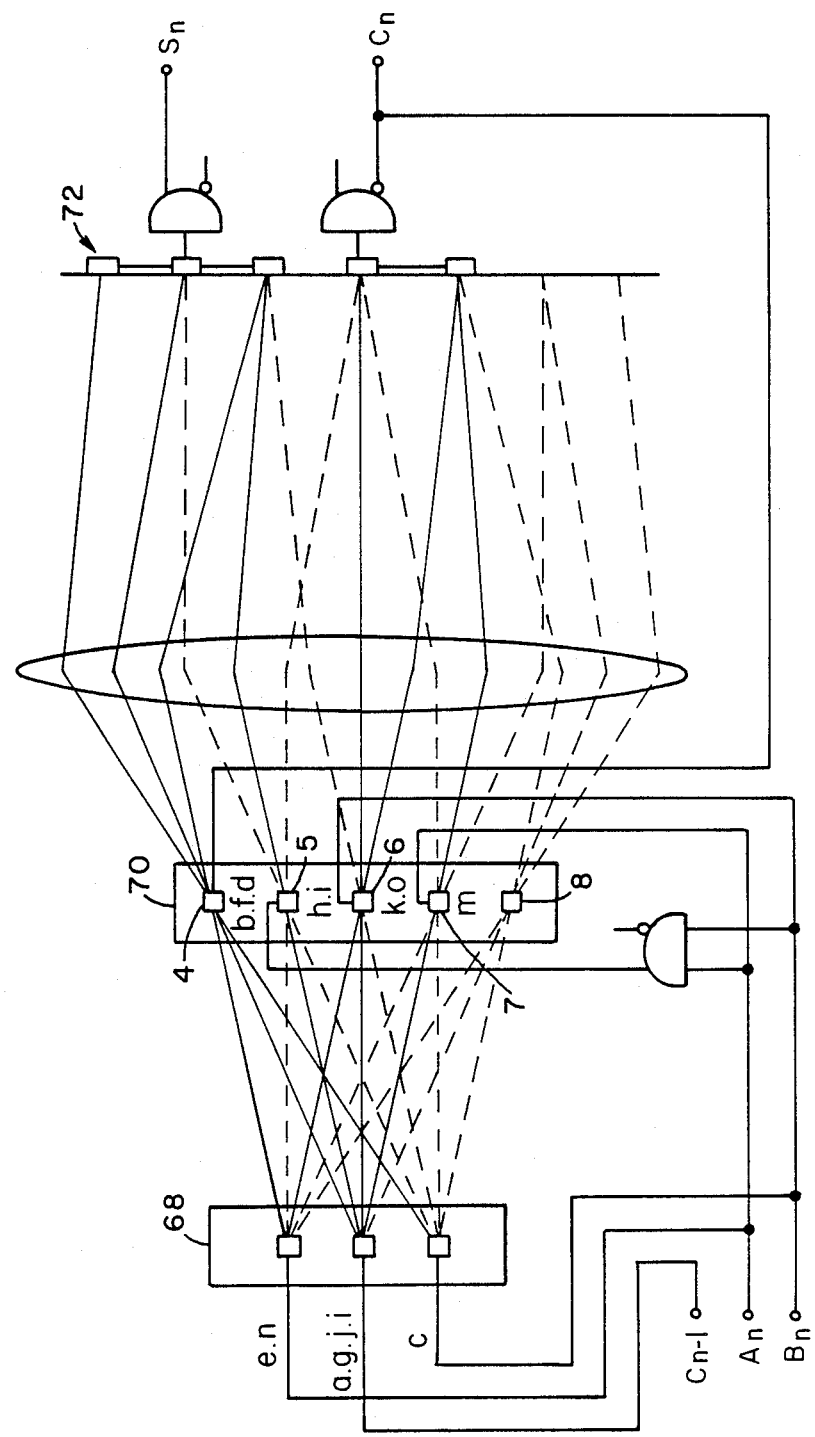
FIG. 13 is a block diagram of an optical full adder, broadcast, in accordance with the present invention.

This electrode redundancy can be automatically reduced by global broadcast methods as shown in FIG. 13. Here the number of working electrodes has been reduced from 14 to the minimum 7 that are required. Notice that the general mapping of the available rays. Given full broadcast capability of 3, acousto-optic cell 68 electrodes 1, 2, and 3, into the following five electrodes, acousto-optic cell 70 electrodes 4, 5, 6, 7 and 8, 15 possible paths can be chosen. For the full adder only 7 are used as only seven gates are required. The seven that are used are shown in bold lines. The unused rays are dotted. The combination of global broadcasting between electrodes, acousto-optic cells 68 and 70, and the global focusing onto the detectors 72 represent a balanced optical "and-or-invert" circuit. Many other possibilities exist for interconnects. After considerable manipulation, FIG. 13 represents what is believed to be the most optimal interconnect scheme.

OPTICAL 2-BIT BY 2-BIT SYSTOLIC MULTIPLICATION ARRAY USING COMBINATORIAL LOGIC

In order to approach more complicated circuits, such as systolic multiply modules, square roots and division cells, an analysis of the cells employs Karnough mapping to yield often pleasant results. Although the task of Boolean reduction is often tedious, the results are certainly worth while. The following example of a 2×2 digital multiplier demonstrates the direction in which this architectural concept may be developed further. In addition to the 2×2 multiplier, a 3×3, and a 4×4 multiplier have been designed and implemented in accordance with the present invention.

On a historical note, previous optical multiply schemes were centered about the DMAC (Digital Multiplication by analog convolution) algorithm. The difficulty involved in threshold detecting many analog levels has provided the motivation to seek new implementations and design approaches. The objectives were: (1) The optical machine should produce the binary weighted outputs directly to the detectors, (for example, for the 2 bit×2 bit multiply, the machine should be given two two-bit binary words and produce a single 4 bit binary result at the detector), (2). The detectors should not need to threshold any levels, but merely detect the presence of light, (3) the multipliers should be configurable in a systolic array.

Figure 14:
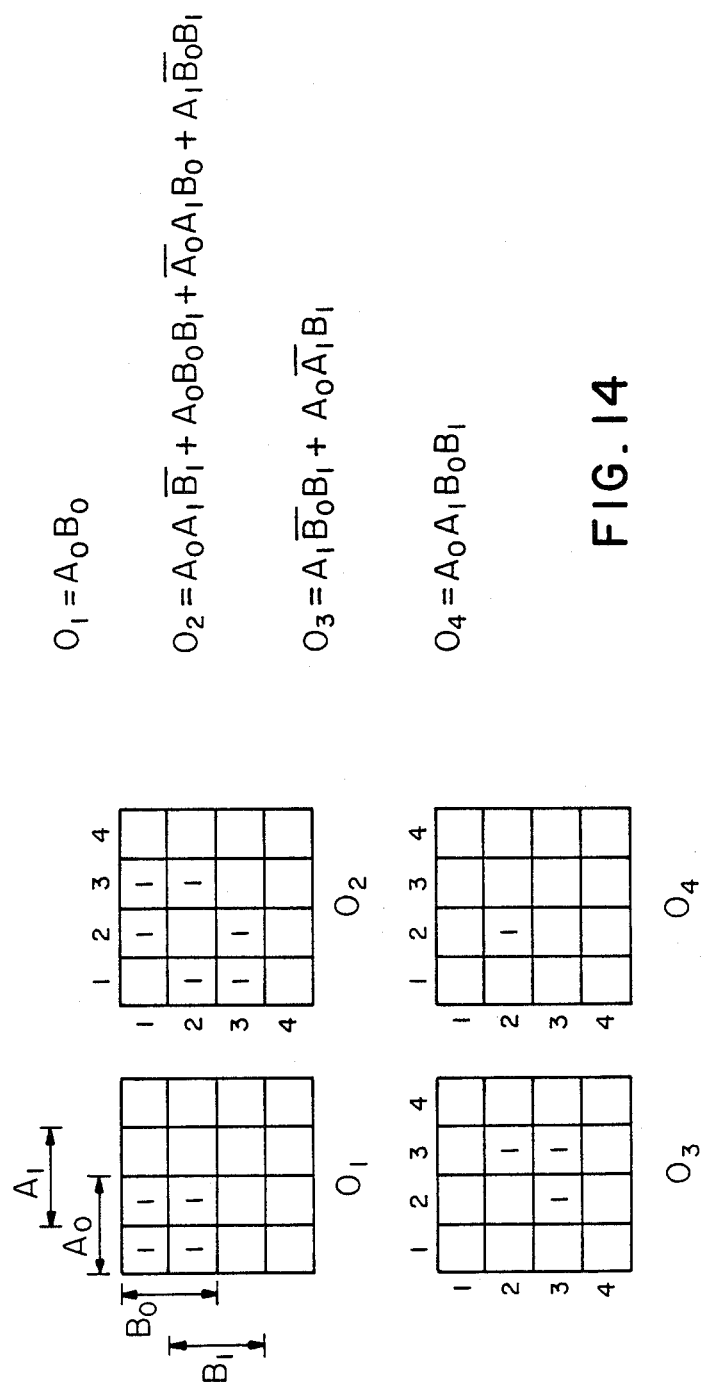
FIG. 14 is a set of Karnaugh maps and equations for $2\times2$ multiplication.
Figure 16:
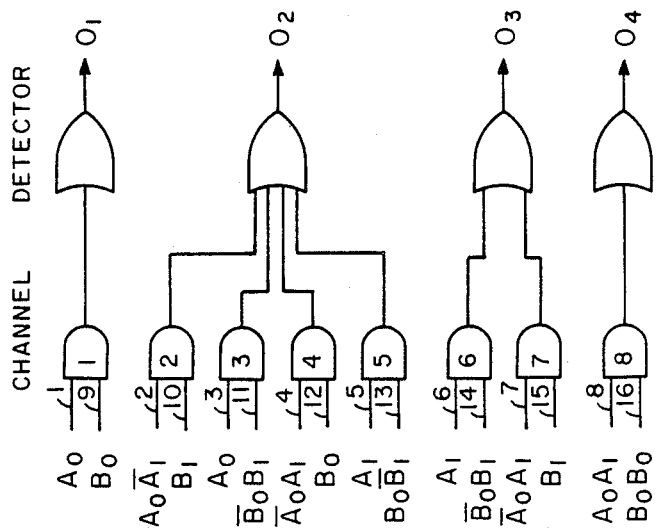
FIG. 16 is a schematic representation of PLA plane in the optical computer in accordance with the present invention.
Figure 15:
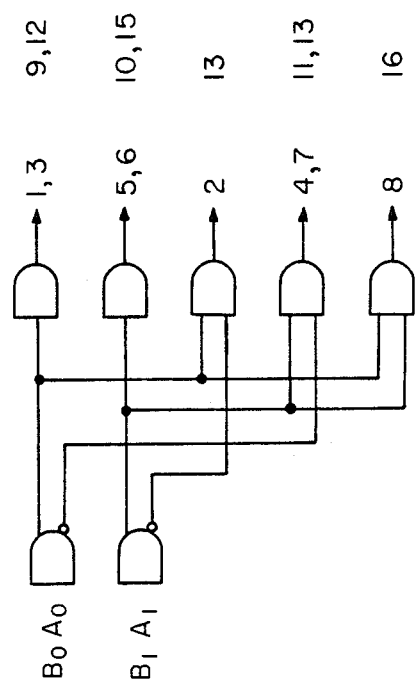
FIG. 15 is an input combinatorial logic conditioner for a $2\times2$ multiply case in accordance with the present invention.

Examination of the Karnough map for the 2×2 bit multiply, as shown in FIG. 14, shows that after Boolean reduction of the four equations, eight combinations are generated from five pairs of both A(0,1) and B(0,1). They are $\overline{A_0}, \overline{A_1}, \overline{A_0}A_1, \overline{A_0}A_1$, and $A_0A_1$ for A(0,1), and $B_0, B_1, \overline{B_0}B_1, \overline{B_0}B_1$, and $B_0B_1$ for B(0,1). (Each bold letter represents the complement bit, whereas in the Figures they have a bar over them.) These five pairs should be split to eight "and-or invert circuits" where the outputs produce the desired results since there are eight terms, each including an AND operation, which are ORed together. The first step is to produce the five pairs. Once produced they will be input to and used over and over in the acousto-optic cell 68 and 70, as all terms are multiplied. FIG. 15 shows the combinatorial input logic conditioner. This can be built in silicon with one or two SSI chips as it consists of only 7 gates. The correct five combinations for both A(0,1) and B(0,1) are then sent to the optical computer where the eight terms are then "AND"ed and "OR"ed correctly as shown in FIG. 16. The resultant output is a four bit word with the correct bit weighting.

Figure 17:
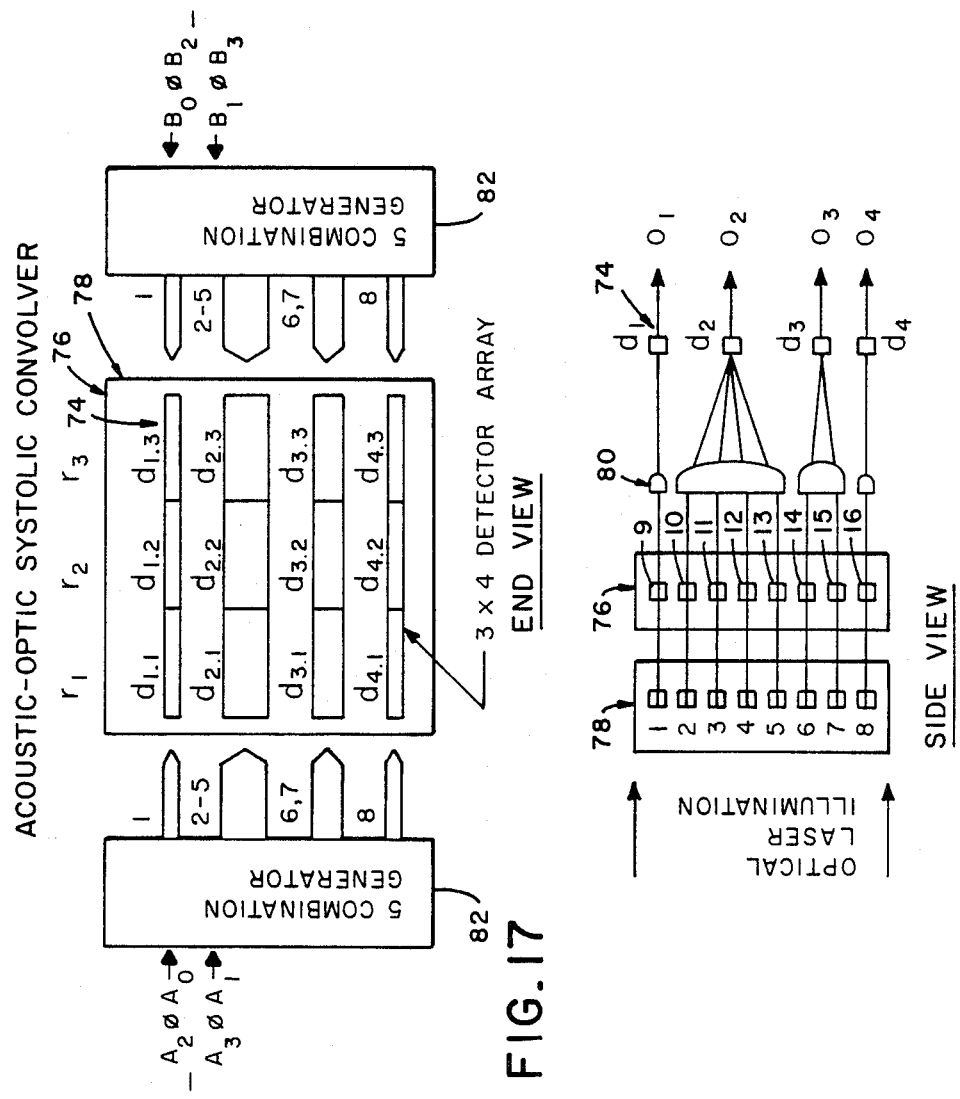
FIG. 17 is a systolic 2-bit$\times$2 bit multiply array which is configured to produce a linear array of output multiplies in accordance with the present invention.
Figure 18:
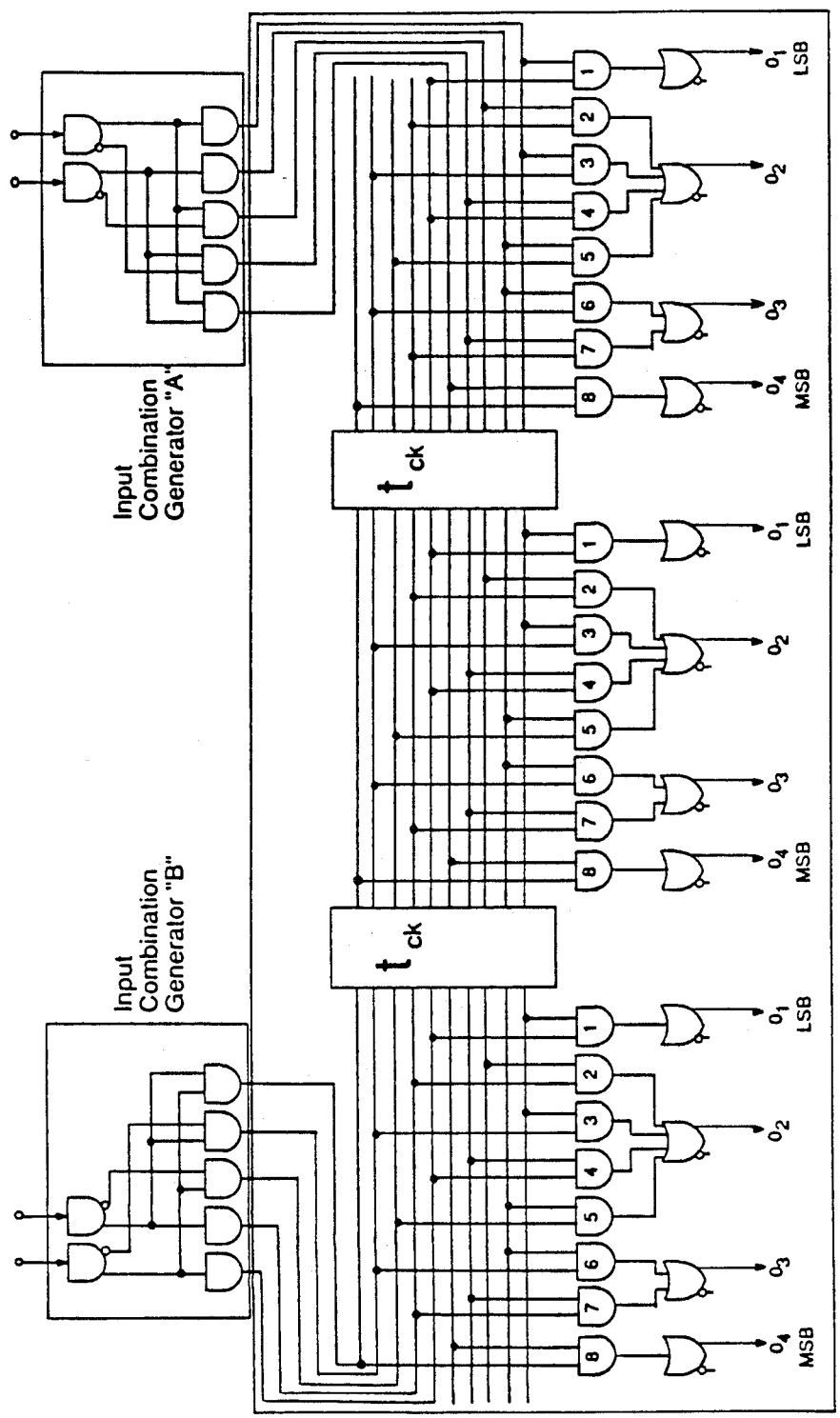
FIG. 18 is a gate representation of the systolic optical circuit of FIG. 17.

One may implement the circuit of FIG. 16 as a systolic optical circuit as shown in FIG. 17, or the systolic digital gate representation as shown in FIG. 18. Effectively the optical computer is repeating the second step of the multiply many times as the data propagates from left to right, for the A data, and right to left, for the B data. The end view of FIG. 17 shows detector array 74 and acousto-optic cells 76 and 78 superposed upon one another. The side view of FIG. 17 shows their relative positions along the optical path. Lens group 80, employs four distinct lenses to focus the appropriate rays onto the detector elements of detector array 74.

In each PLA region a multiply is performed. The combination generators 82 are only used once at each end of the array. Again the acousto-optic cells 76 and 78 are operating like shift register delay lines to allow the systolic implementation. Electrodes 1-8 receive combinations of bits from the A and B words for propagation in acousto-optic cell 76, while electrodes receive combinations of bits from the A and B words for propagation in acousto-optic cell 78, according to the pattern shown in FIGS. 15 and 16.

Combinatorial logic based optical computing is a new approach to implement a virtually unlimited set of non-linear functions. Previous schemes were limited to analog multiples by straight analog methods, DMAC and threshold logic. Additions were performed in analog or not at all optically.

BOOLEAN ALGEBRA FOR 3×3 BIT MULTIPLICATION

As has been shown above, the first step in generating the optical mapping of any digital function is to generate a most reduced set of "AND-OR-INVERT" Boolean algebraic expressions. This allows the optical detector to act as an "OR" gate rather than a summation or threshold detection device. In addition, sequentially illuminated spatial light modulators need not multiply analog values, where accuracy is of great concern, but merely act as "AND" gates. Although it may be shown that optical systems can perform more than simple "AND-OR-INVERT" functions, (such as exclusive-or, etc.), the approach of the present invention is favored because it is believed that it is the simplest and most efficient method for current optical devices.

FIG. 19, Table 1, shows the six Boolean equations for 3×3 bit multiplication. Here the two 3 bit numbers A and B to be multiplied are represented as $A_0$, $A_1$, $A_2$ and $B_0$, $B_1$, $B_2$. $A_0$ and $B_0$ represent the least significant bit (LSB) of the number A and B respectively. $A_2$ and $B_2$ therefore will represent the most significant bit (MSB) of A and B as well. Bars over any bit represent its complement or "NOT"ed function. As shown earlier, the 2×2 bit multiplication can be represented as four equations for each desired output, where the total number of Boolean terms represented is eight and the total number of combinations is five. For the 3×3 bit multiplication, 6 equations are desired, one for each desired binary weighted result. Reduction from the Karnough maps started with a total of 16 interactions for $O_1$, 24 interactions for $O_2$, 28 for $O_3$, 22 for $O_4$, 15 for $O_5$, and 6 for $O_6$ for a total of 111 interactions. After Boolean reduction, the problem was reduced to 35 terms (from 111) as shown in Table 1, where the total number of combinations is now 16 for the 3×3 bit case, as shown in Table 2, as compared to 5 for the 2×2 bit case.

Optimal Boolean reduction is a subject all to itself and will not be dealt with in the application. However, it is worth mentioning that the optical architecture should be considered when reducing these equations as derived from the Karnough maps. Conventional Boolean reduction algorithms may help, however, those algorithms available are typically optimized for VLSI or planar technologies. Optical technology is inherently three dimensional in nature, and therefore the interconnect schemes have an additional dimension to work with, thereby reducing the effectiveness of conventional reduction formula. However, it should be noted that as long as the designer is arranging his optical system as systolic programmable combinatorial logic arrays, these algorithms can be of great benefit. Several methods are available such as the tabular method for deriving minimal sums, Quine's method on simplification of Boolean expressions, and others.

3×3 BIT MULTIPLICATION CIRCUITRY FOR OPTICAL IMPLEMENTATION

Figure 23A:
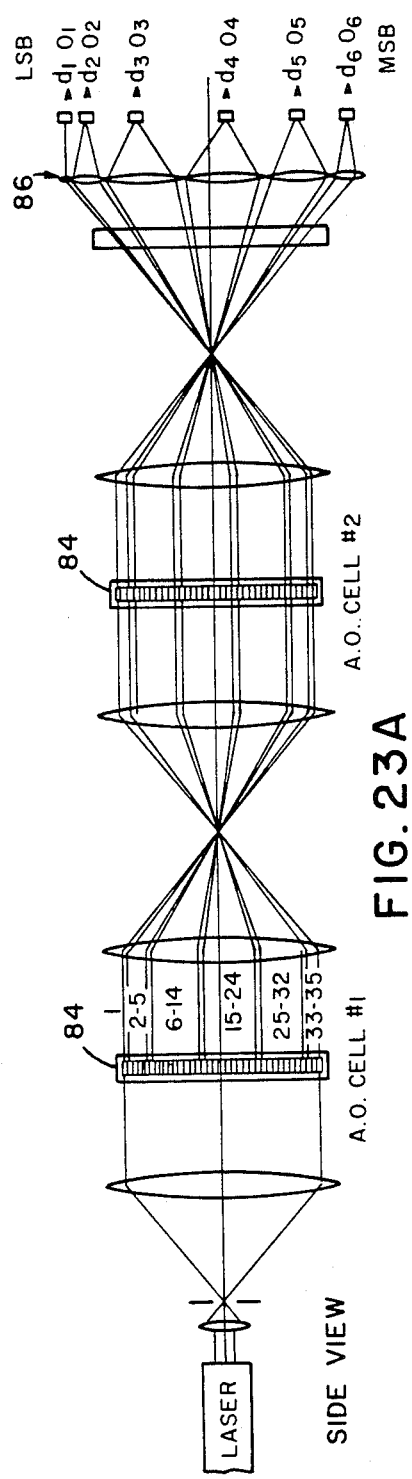
FIGS. 23A, 23B and 23C is an illustration of the side view, top view, and end view, respectively, of a systolic acousto-optic binary computer parallel implementation of the digital optical $3\times3$ bit combinatorial systolic multiplication array in accordance with the present invention.

As shown in FIG. 20, Table 2, the 35 terms used to generate the six equations needed to describe the 3×3 bit multiplication, consist of only 16 combinations. However, these 16 combinations, shown as $a_n$ and $b_n$, are used up to as many as three times. One can begin to see the global broadcast possibilities. The CH column is shown to identify the assignment of combinations to each other. In addition, in a full parallel optical implementation, as shown in FIG. 23A, these can actually be the channel assignment as in a Systolic Acousto-Optic Binary Convolver (SAOBiC). Reference is made hereby to U.S. patent application Ser. No. 517,771, filed July 27, 1983, now U.S. Pat. No. 4,667,300, issued May 19, 1987, Computing Method and Apparatus, incorporated herein by reference, in which such an apparatus is described and claimed. Although these combination terms could be generated optically, they are only required once as in the 2×2 bit multiplier and are therefore generated here apriori to the optical computer with a few ECL chips as shown in FIG. 21.

Figure 22:
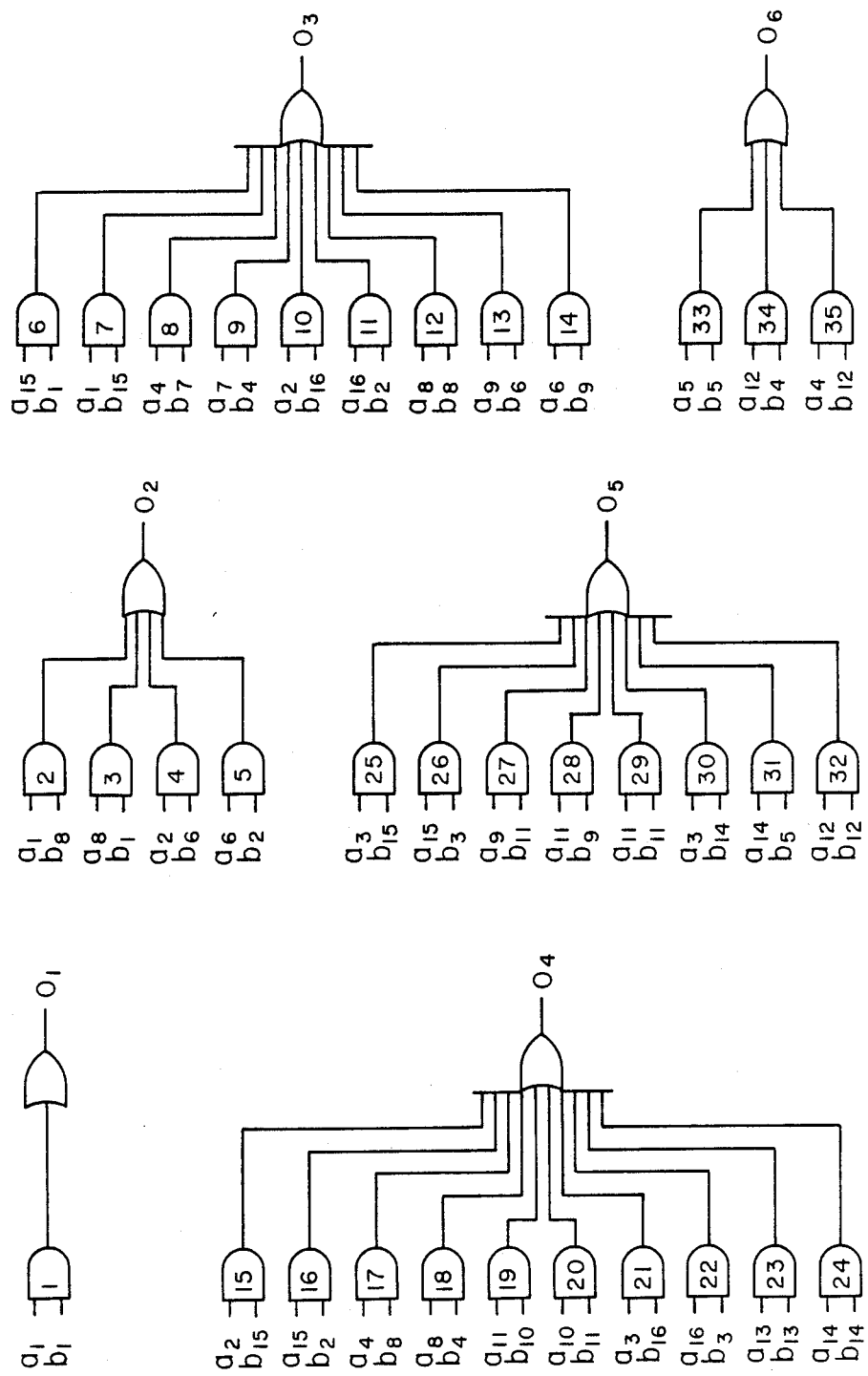
FIG. 22 is a representative logical illustration of the six "and-or-invert" networks used in conjunction with the combination generator of FIG. 21 to complete a $3\times3$ bit multiplication.

The second step of the multiplication process is the massive "AND-OR-INVERT"ing. The circuitry used to complete the process, once the combinations are formed, is modeled in FIG. 22. Six "and-or-invert" circuits are used for each multiply region. The least significant bit is, of course, merely $A_0B_0$. As higher order outputs are formed, compute gain is realized. $O_2$ realizes a gain of 4, $O_3$—a gain of 9, $O_4$—a gain of 10, $O_5$ a gain of 8, and $O_6$ a gain of 3 due to the "fan-in" on the detector.

By splitting up the multiplication problem into two steps, combination generation and "AND-OR-INVERT"ing, optical implementation is made relatively straight forward. These "and-or-invert" circuits will be reproduced optically hundreds of times, depending on the desired length of the array, whereas the combination generation circuit is used only once at the boundaries in the systolic linear multiply array. The combinations will propagate into the systolic array from each end of the array. Each cell within the systolic array will be comprised of the six "AND-OR-INVERT" circuits shown in FIG. 22.

PARALLEL OPTICAL IMPLEMENTATION

Figure 23B:
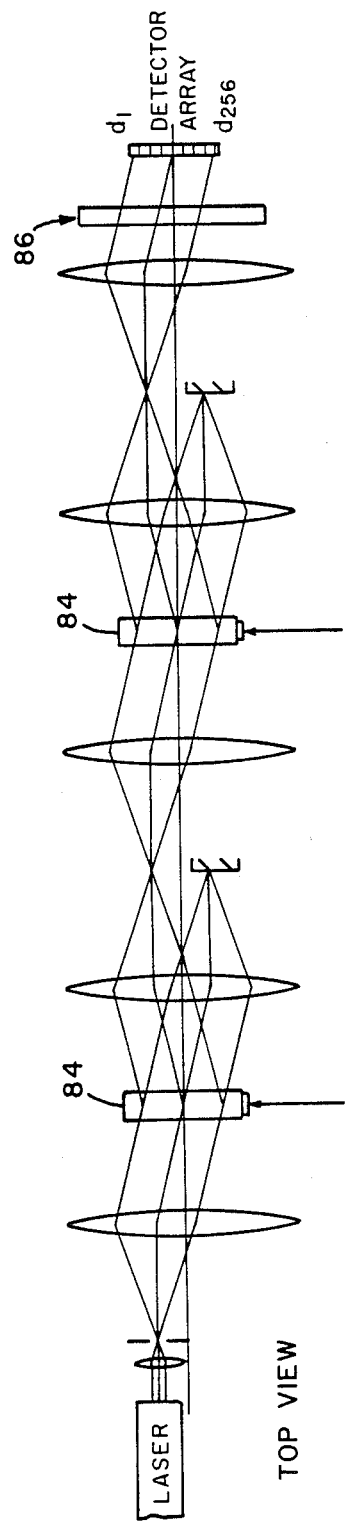
Figure 23C:
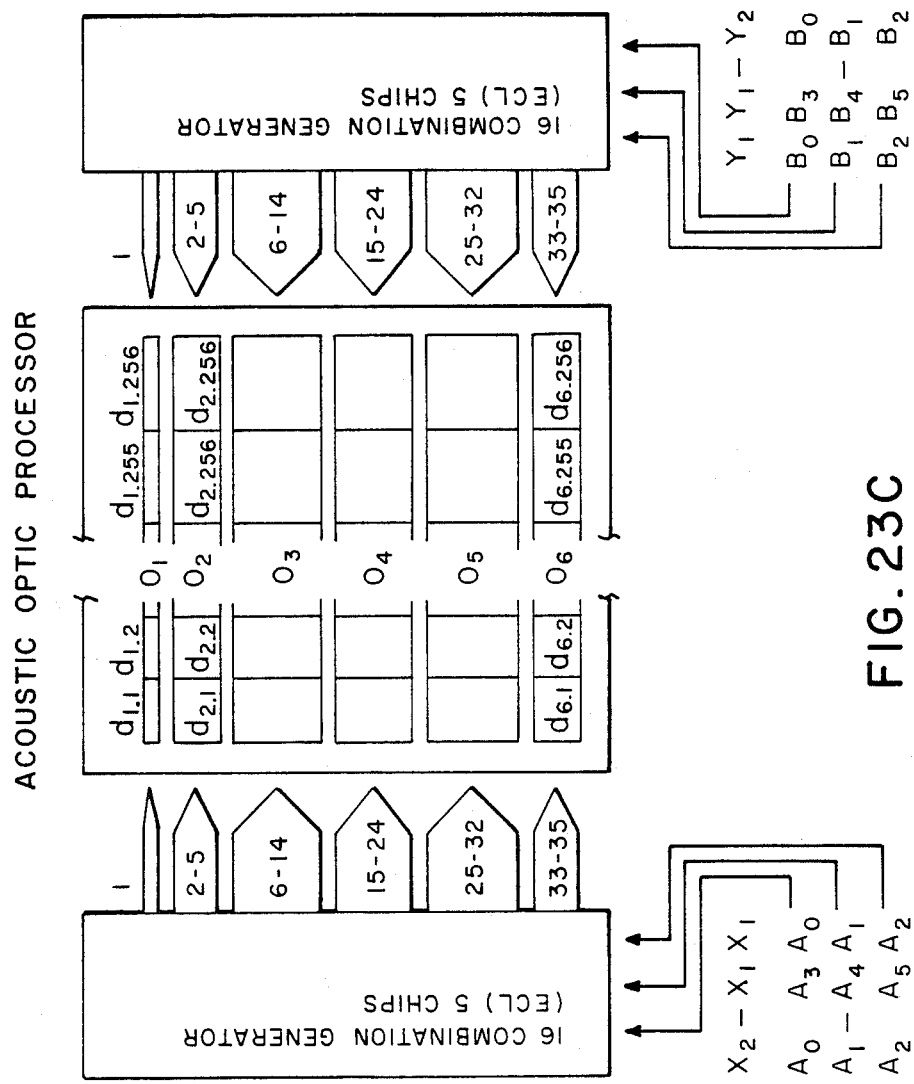

FIGS. 23A, 23B, and 23C shows the parallel optical implementation of the SAOBiC for the implementation of a linear 3×3 bit systolic multiplication vector. The systolically interconnected "AND-OR-INVERT" circuits for each processing element are interconnected through the use of the telecentrically imaged multi-channel acousto-optic Bragg cells 84 and fan-in cylindrical lenses 86. The optical computer architecture can also be described as multi-channel convolver with beam steering output optics, i.e., the cylindrical lenses that form the appropriate "OR" fan-in function. Single channel convolver architecture is well understood and documented.

A prototype of the optical computer shown in FIG. 23A has been constructed and successfully tested. For the light source 88, 100 mw Argon laser is used. This allowed viewers to see the laser. Normally, a production version would be built with laser diodes. After collimation, the laser illuminates a 32 channel acousto-optic cell, 4 channels at a time (for demonstration purposes.) Each multi-channel cell consists of a large $TeO_2$ crystal. The transducers are trapezoidal in shape such that the far field acoustic diffraction patterns cancel. The orientation of the crystal permitted efficient longitudinal propagation such that near 100%/500 mwatt diffraction efficiency could be achieved at the transducer, between the 3 db power attenuation points of 275 Mhz and 600 Mhz, respectively. With this system bandwidth in excess of 300 MHz per channel, coupled with a usable aperture of up to 5.12 $\mu$secs/channel, and a clock speed of 8 ns, up to 20,480 digital pulses could be placed in the aperture. Of course, with every 8 ns they would all shift to the next processing element respectively.

The top view of FIG. 23A reveals that the architecture built is multiplicative in nature, rather than additive, or interferometric (although multiplicative, interferometric architectures are possible.) This allows excellent noise suppression since the noise is also multiplicative. For example if the on/off ratio on each bit driving a channel is 10 to 1 the multiplicative on/off ratio is 100 to 1. This situation can only improve for architectures employing "3 input and gates" where 3 cells in series would be used. The on/off ratio would improve to 1000 to 1, and so forth. The end view of the computer, shown schematically in FIG. 23C, suggests the through-put capable with such a machine. With the 8 ns clock rate used, easily reproduced with the 300 MHz cells, full 24-bit word could be input every 128 ns, thus allowing for a zero between every bit corresponding to an input data stream of 62.5 Mbytes/second assuming floating point operation. Using a time aperture of only 4.096 $\mu$secs, 32 words would thus be counter propagating in each cell at any instance. Consequently, the systolic vector length is a linear 32×1. This is an attractive size for matrix-matrix or matrix-vector mathematics, in as much as the minimum kernel size is 32. As compared to other schemes, minimum kernel sizes have been reported up to as high as 1000, thus severely minimizing their algorithmic flexibility. Finally, the effective through-put rate is calculated as 32 multiples every 64 ns, due to the fact that the counter propagation of words in the cells doubles the effective input time per word. This is equivalent to 500 million 24 bit multiplications (using 3 bit partial products) per second or 500 MOPS. The exact 3 bit rate is 32 GOPS (32 giga operations per second), where the operations here are defined as a 3×3 bit multiplication.

GLOBAL BROADCAST IMPLEMENTATION OF THE 3×3 BIT LINEAR SYSTOLIC MULTIPLE ARRAY

Since only 16 combinations are used, although 35 interactions are required, it is possible through optical broadcast methods to reduce the number of input channels on the multi-channel acousto-optic Bragg cells to 16. Of course, this would also apply to any spatial light modulator arrangement in lieu of Bragg cells. FIG. 24 depicts the interconnect arrangement for each output bit $O_1$ through $O_6$. Although six schematics are shown, they would be used as composite as shown in FIG. 25.

Each schematic shows only 16 input transducers on Channel A (as compared to the 35 used in the full parallel implementation), the 16 input transducers for Channel B, and the 6 output detectors for outputs $O_1$ through $O_6$. The channels of each 16 element transducer array are driven here with the exact combination representation as shown in Table 2. As can be seen, the desired interconnect for the LSB is simply $A_0B_0$ and the first detector is used. Clearly, no gain is realized, and the interconnect is direct. For the second most insignificant bit, with output $O_2$, four combination interactions are required as describe in the $O_2$ equation in Table 1. Notice that the first transducer $a_1$ sends the combination term to not only transducer $b_1$ for output $O_1$ but also to transducer $b_8$ for output $O_2$ and transducer $b_{16}$ for output $O_3$. This type of interconnect scheme is shown for all combinations in FIG. 24 as planar interconnects.

Three dimensional global interconnects, rather than two dimensional interconnects, as shown here for planar PLA systolic implementation, are possible through folding the interconnects, in the case of utilizing acousto-optic devices, in time and space and space only, for a "perfect" spatial light modulator.

The interconnect symmetry for multiplication should also be pointed out. Notice for example output schematic $O_3$. Transducers $a_1$ and $a_2$ are connected to transducers $b_{15}$ and $b_{16}$. As well, transducers $a_{15}$ and $a_{16}$ are interconnected to $b_1$ and $b_2$, perfect symmetry. This suggests that further reduction is possible by using three and four input gates, i.e., a third and/or fourth sequential spatial light modulator.

Although several schemes have been proposed to implement global interconnects, perhaps the simplest to understand is a simple holographic Fourier transform plane filter. As is well known, a Fourier plane complex filter can connect collimated rays from any point at the input plane to any point in a subsequent image plane of the input plane. Sampling densities prove to be sufficient. For example, if 8 ns pulses are used in to longitudinal mode $TeO_2$, velocity=6.3 mm/$\mu$sec, then the pulse width in space corresponds to 50.4 $\mu$m. Since space bandwidth product is conserved from plane to plane in an ideal optical system, i.e., not diffraction limited, then with holographic elements with fringe spacings on the order of 500 lp/mm, or 0.5 $\mu$m, sampling densities in excess of $100^2$ can be achieved. This is certainly enough to provide extremely efficient, sidelobe suppressed, optical interconnections.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. An apparatus operable on a first set and a second set of binary data for performing a binary operation upon the binary data comprising optical means for performing a Boolean AND-OR operation upon binary information supplied to it; and combinatorial logic means responsive to the first and second sets of binary data for conditioning the first and second sets of binary data and applying the conditioned first and second sets of binary data to the optical means as the binary information to be operated upon thereby, wherein the conditioning performed by said combinatorial logic means includes the formation of different combinations of the first and second sets of binary data and the complemented bits of the first and second sets of binary data as a function of the binary operation being implemented.

2. The apparatus of claim 1, wherein the optical means comprise light source means for providing a beam of light which propagates along an optical path;

first acousto-optic cell means responsive to a first set of conditioned binary data and positioned in the optical path for propagating optical representations of the first set of conditioned binary data transversely to the optical path which modulate the light propagating therethrough;

second acousto-optic cell means responsive to a second set of conditioned binary data and positioned in the optical path for propagating optical representations of the second set of conditioned binary data transversely to the optical path, wherein the second acousto-optic cell means is positioned relative to the first acousto-optic cell means so that modulated light from the first acousto-optic cell means is modulated by the representations of the second set of conditioned binary data propagating through the second acousto-optic cell means;

detector means positioned in the optical path to receive light which has been modulated by the first and second acousto-optic cell means for determining the presence or absence of light at predetermined points in a plane transverse to the optical path; and lens means positioned in the optical path between the detector means and the second acousto-optic cell means for focusing portions of the light which have been modulated by the first and second acousto-optic cell means onto selected ones of the predetermined points of the detector means, wherein the portions of the light which are so focused are selected according to the binary operation being performed by the apparatus upon the binary data.

3. The apparatus of claim 2, wherein the light source means provide rays of light which propagate in parallel along the optical path so that light which passes through a region of the first acousto-optic cell means also passes through a corresponding region of the second acousto-optic cell means.

4. The apparatus of claim 3, wherein the binary operation being implemented is a full adder which operates upon the first and second sets of binary data and upon a current carry bit and a previous iteration carry bit, and further wherein the first acousto-optic cell means has electrodes a, c, e, g, i, k, and m, and the second acousto-optic cell means has electrodes b, d, f, h, j, l, and n, and further wherein the combinatorial logic means supply the bit $A_n$ of the first set of binary data, the corresponding bit $B_n$ of the second set of binary data, the carry bit $C_n$, and the previous iteration carry bit $C_{n-1}$ to the electrodes according to the relationship.

| Bit | Electrodes |
|---|---|
| $A_n$ | e, m, n |
| $B_n$ | c, k, o |
| $C_n$ | b, d, f |
| $C_{n-1}$ | a, g, j, l |
| $A_n B_n$ | h, i, | where n is an integer.

5. The apparatus of claim 4, wherein the detector means have first and second detector regions, and further wherein the lens means comprises a first lens for focusing light modulated by date input via electrode pairs a-b, c-d, e-f, and g-h onto the first detector region; and a second lens for focusing light modulated by data input via electrode pairs i-j, k-l, and m-n onto the second detector region, wherein the first detector region provides the sum result of the operation and the second detector region provides the carry result of the operation.

6. The apparatus of claim 3, wherein the binary operation being implemented is a binary word comparison operation in which the first set of binary data represents a first word which is to be compared against a second word represented by the second set of binary data, and further wherein the lens means focus the modulated light onto one of the predetermined points in the plane transverse to the optical path which is operated upon by the detector means.

7. The apparatus of claim 6, wherein the combinatorial logic means conditions the first and second sets of binary data so that binary information supplied to the first and second acousto-optic cell means includes each bit and its complement of the first word, and bit and its complement of the second word, and further wherein the binary information is applied to the first and second acousto-optic cell means so that light modulated by the complement of a bit from the first word is modulated by the corresponding uncomplemented bit from the second word, and so that light modulated by the complemented bit of the first word is modulated by the complement of a corresponding bit from the second word.

8. The apparatus of claim 6, further including an additional plurality of said optical means and said combinatorial logic means so that a bank of said optical means and said combinatorial logic means is provided for simultaneously comparing a plurality of pairs of binary words.

9. The apparatus of claim 8, wherein the first acousto-optic cell means of each of the plurality of apparatus comprise a single bragg cell having a length which permits the bits of each of the first word of the pairs of binary words to propagate in parallel across the optical path;

the second acousto-optic cell means of each of the plurality of apparatus comprise a single bragg cell having a length which permits the bits of each of the second word of the pairs of binary words to propagate in parallel across the optical path; and further wherein, the combinatorial logic means for each of the plurality of apparatus comprise first systolic combinatorial logic means for supplying the first word of each of the pairs of binary words to the first bragg cell so that optical representations of said first words propagate systolically in one direction across the optical path; and second systolic combinatorial logic means for supplying the second word of each of the pairs of binary words to the second bragg cell so that optical representations of said second words propagate systolically in a direction counter to the direction of propagation of the optical representations of said first words.

10. The apparatus of claim 2, wherein the light propagating through the first acousto-optic cell means is broadcast to all regions of the second acousto-optic cell means which are positioned in a plane parallel to the optical path, and further including means positioned in the optical path for preventing light passing through selected regions of the first acousto-optic cell means from impinging upon selected regions of the second acousto-optic cell means, wherein the regions selected are selected as a function of the binary operation being implemented by the apparatus.

11. The apparatus of claim 10, wherein the binary operation being implemented is a full adder and the first acousto-optic cell means has electrodes 1, 2, and 3, and the second acousto-optic cell means has electrodes 4, 5, 6, and 7; and further wherein the combinatorial logic means supply the bit $A_n$ of the second set of binary data, the carry bit $C_n$, and the previous iteration carry bit $C_{n-1}$ to the electrodes according to the relationship

| Bit | Electrodes |
|---|---|
| $A_n$ | 1, 7 |
| $B_n$ | 3, 6 |
| $C_n$ | 4 |
| $C_{n-1}$ | 2 |
| $A_n B_n$ | 5; and | further wherein the preventing means block the propagation of light between the following selected regions of the first and second acousto-optic cell means:

| From Electrode | To Electrodes |
|---|---|
| 1 | 5, 7 |
| 3 | 5, 6, 7. |

12. The apparatus of claim 11, wherein the detector means include a first detector region positioned to detect the presence of light modulated by binary data applied to the electrode pairs (1,4), (2,4), (3,4) and (2,5); and a second detector region positioned to detect the presence of light modulated by binary data applied to the electrode pairs (1,6), (2,6), and (2,7).

13. The apparatus of claim 2, wherein the binary operation being implemented is a 2 bit by 2 bit multiply which operates upon the first and second sets of binary data, and further wherein the first acousto-optic cell means has electrodes 1, 2, 3, 4, 5, 6, 7, and 8, and the second acousto-optic cell means has corresponding electrodes 9, 10, 11, 12, 13, 14, 15, and 16, and further wherein the combinatorial logic means supply the complemented and uncomplemented bits $A_0$, and $A_1$ of the first set of binary data, and the corresponding complemented and uncomplemented bits $B_0$ and $B_1$ of the second set of binary data to the electrodes according to the relationship

| Bit | Electrodes |
|---|---|
| $A_0$ | 1, 3 |
| $A_1$ | 5, 6 |
| $B_0$ | 9, 12 |
| $B_1$ | 10, 15 |
| $A_0 \underline{A_1}$ | 8 |
| $\underline{A_0} A_1$ | 2 |
| $A_0 A_1$ | 4, 7 |
| $B_0 \underline{B_1}$ | 16 |
| $\underline{B_0} B_1$ | 13 |
| $B_0 B_1$ | 11, 13. |

14. The apparatus of claim 13, wherein the detector means have first, second, third, and fourth detector regions, and further wherein the lens means comprises a first lens for focusing light modulated by data input via electrode pair (1,9) onto the first detector region;

a second lens for focusing light modulated by data input via electrode pairs (2,10), (3, 11), (4, 12), and (5, 13) onto the second detector region;

a third lens for focusing light modulated by data input via electrode pairs (6, 14) and (7, 15) onto the third detector region; and a fourth lens for focusing light modulated by data input via electrode pair (8, 16) onto the fourth detector region, wherein the first detector region provides the least significant bit result of the operation;

the second and third detector region provide the next most significant bit results of the operation; and the fourth detector region provides the most significant bit result of the operation.

15. A method for implementing binary operations upon first and second sets of binary data by way of optical processing, wherein the binary operations can be expressed in terms of Boolean AND-OR elements operating upon combinations of complemented and uncomplemented bits of first and second sets of the binary data, comprising the steps of conditioning the binary data and applying the conditioned binary data to the optical means by way of combinatorial logic in accordance with the binary operations being implemented;

performing the Boolean AND-OR operations upon supplied binary information by way of optical processing means.

16. The method of claim 15, wherein the step of conditioning and applying the binary data includes the steps of generating complemented and uncomplemented versions of the binary data; and forming combinations of the complemented and uncomplemented versions of the binary data as function of the binary operation being implemented.

17. The method of claim 16, wherein the preforming step comprises the steps of propagating light along an optical path;

selecting first and second sets of combined complemented and uncomplemented versions of the binary data in accordance with the operation being implemented;

propagating optical representations of a first set of the combined complemented and uncomplemented versions of the binary data transversely to the optical path at a predetermined section of the optical path so as to modulate the light propagating through the predetermined section of the optical path;

propagating optical representations of the second set of the combined complemented and uncomplemented versions of the binary data transversely to the optical path, wherein the modulated light the representations of the first set of combined binary data is modulated by the representations of the second set of combined binary data;

focusing portions of the light which have been modulated by the representations of the first and second sets of the combined complemented and uncomplemented versions of the binary data onto selected points in a plane transverse to the optical path, wherein the portions of the light which are so focused are selected according to the binary operation being performed upon the binary data; and determining the presence or absence of light at the predetermined points in the plane transverse to the optical path.

18. The method of claim 16, wherein the step of propagating optical representations of the second set of combined complemented and uncomplemented versions of the binary data further includes the steps of propagating said optical representations in a direction counter to the propagation of the representations of the first set of combined complemented and uncomplemented versions of the binary data being propagated.

19. The method of claim 17, wherein first and second sets of combined binary data are propagated in bit parallel form.

20. The method of claim 18, wherein in the step of propagating representations of the second set of combined complemented and uncomplemented versions of the binary data transversely to the optical path, said propagation occurs over a predetermined region transverse to the optical path, further including the step of broadcasting light modulated by the representations of the first set of combined complemented and uncomplemented versions of the binary data into selected portions of the predetermined region over which the representations of the second set of combined binary data are propagating.

* * * * *